US009707845B1

(12) United States Patent
Nienhouse

(10) Patent No.: US 9,707,845 B1
(45) Date of Patent: Jul. 18, 2017

(54) SYSTEM AND METHOD FOR LOCATING AND DETERMINING SUBSTANCE USE

(71) Applicant: Robert Frank Nienhouse, Hinsdale, IL (US)

(72) Inventor: Robert Frank Nienhouse, Hinsdale, IL (US)

(73) Assignee: ROBERT F. NIENHOUSE 1997 DECLARATION OF TRUST, Hinsdale, IL (US)

( * ) Notice: Subject to any disclaimer, the term of this patent is extended or adjusted under 35 U.S.C. 154(b) by 37 days.

(21) Appl. No.: 14/322,805

(22) Filed: Jul. 2, 2014

Related U.S. Application Data

(60) Provisional application No. 61/842,186, filed on Jul. 2, 2013.

(51) Int. Cl.
G08C 19/22 (2006.01)
H04Q 9/00 (2006.01)
B60K 28/06 (2006.01)

(52) U.S. Cl.
CPC ............ B60K 28/063 (2013.01); H04Q 9/00 (2013.01)

(58) Field of Classification Search
CPC ............................... B60K 28/063; H04Q 9/00
USPC ..................................... 340/870.07
See application file for complete search history.

(56) References Cited

U.S. PATENT DOCUMENTS

| | | | | |
|---|---|---|---|---|
| 3,437,449 A * | 4/1969 | Luckey | .................. | G01N 33/98 422/85 |
| 4,843,377 A * | 6/1989 | Fuller | ................. | G07C 9/00103 340/573.4 |
| 6,748,792 B1 * | 6/2004 | Freund | ................. | B60K 28/063 180/272 |
| 8,060,308 B2 * | 11/2011 | Breed | .................. | B60N 2/2863 340/601 |
| 8,280,436 B2 * | 10/2012 | Harris, Jr. | ............ | B60K 28/066 180/272 |
| 2002/0127145 A1 * | 9/2002 | Der Ghazarian | ...... | A61B 5/083 422/83 |
| 2003/0093187 A1 * | 5/2003 | Walker | .................... | B64C 13/20 701/1 |
| 2004/0239510 A1 * | 12/2004 | Karsten | ................ | B60K 28/063 340/576 |
| 2006/0202838 A1 * | 9/2006 | Hawthorne | ............ | A61B 5/145 340/573.1 |

(Continued)

OTHER PUBLICATIONS

"Electronic Monitoring System, MEMS 3000 Home station Installation Guide," ElmoTech Ltd., Mar. 2006.*

(Continued)

Primary Examiner — Nader Bolourchi
(74) Attorney, Agent, or Firm — Lathrop & Gage LLP

(57) ABSTRACT

Levels of substance use, location, and vital signs are remotely monitored for a subject. In one embodiment, the system includes a testing device (102) and a communication device (130). The testing device (102) obtains a breathalyzer sample from a test subject and determines a substance level. The communication device (130) reports the substance level to a remote monitoring station. In addition, location and camera functions of the communication device can report additional information for verification and system integrity. In other embodiments, the system can be incorporated into an ankle bracelet for monitoring movement of an individual or into a vehicle system to prevent operation while impaired.

41 Claims, 16 Drawing Sheets

(56) References Cited

U.S. PATENT DOCUMENTS

| | | | |
|---|---|---|---|
| 2009/0201138 A1* | 8/2009 | Ghazarian | B60K 28/063 340/426.12 |
| 2009/0293589 A1* | 12/2009 | Freund | G07C 5/0891 73/23.3 |
| 2010/0138166 A1* | 6/2010 | Do | G06F 19/3406 702/24 |
| 2012/0031166 A1* | 2/2012 | Lopez | G01N 33/4972 73/23.3 |
| 2013/0021153 A1* | 1/2013 | Keays | G01N 33/4972 340/539.12 |
| 2013/0070043 A1* | 3/2013 | Geva | B60K 28/066 348/14.02 |

OTHER PUBLICATIONS

CNET Reviews, "iBreath: the iPhone Breathalyzer," Dec. 15, 2008.*

"MEMS 3000 Cellular Receiver and Transmitter Installation Guide," ElmoTech, Ltd., 2002-2008.*

* cited by examiner

500 ↴

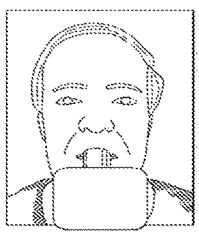
Richard Smith
2937 Main Street
Anywhere, IL 60517
5/10/1947
Male
5'11"
205
Brown
Gray

| NOVEMBER 2011 | | | | | | |
|---|---|---|---|---|---|---|
| SU | M | TU | W | TH | F | SA |
| | | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | | | |

Client Report Detail
12/03/2012 - 01/03/2013

Other Court
INFO here
TBD

Activity:

Thursday, January 3, 2013 Location:37 23.516 -122 02.625
11:30 AM CST    BAC scheduled
12:00 PM CST    Reminder sent SMS 630-430-2000
12:15 PM CST    Late reminder sent SMS 630-430-2000
12:30 PM CST    Missed Report email alert sent to Robert Smith at r.smith@cam-sys.net Wednesday, January 2, 2013 Location:37 23.516 -122 02.625
11:30 AM CST    BAC scheduled
12:00 PM CST    Reminder sent SMS 630-430-2000
12:15 PM CST    Late reminder sent SMS 630-430-2000
12:30 PM CST    Missed Report email alert sent to Robert Smith at r.smith@cam-sys.net Tuesday, January 1, 2013 Location:37 23.516 -122 02.625
11:30 AM CST    BAC scheduled
12:00 PM CST    Reminder sent SMS 630-430-2000
12:15 PM CST    Late reminder sent SMS 630-430-2000
12:30 PM CST    Missed Report email alert sent to Robert Smith at r.smith@cam-sys.net Tuesday, January 1, 2013 Location:37 23.516 -142 02.625
11:30 AM CST    BAC scheduled
12:00 PM CST    Reminder sent SMS 630-430-2000
12:15 PM CST    Late reminder sent SMS 630-430-2000
12:30 PM CST    Missed Report email alert sent to Robert Smith at r.smith@cam-sys.net Tuesday, January 1, 2013 Location:37 23.516 -300 02.625
1:30 PM CST     BAC scheduled
2:00 PM CST     Reminder sent SMS 630-430-2000
2:15 PM CST     Late reminder sent SMS 630-430-2000
2:16 PM CST     BAC Sample taken, reading: .01
2:17 PM CST     BAC Reported to CAM system @ cam-sys.net

*FIG. 5*

SYSTEM AND METHOD FOR LOCATING AND DETERMINING SUBSTANCE USE

RELATED APPLICATIONS

This application claims priority to U.S. Patent Application Ser. No. 61/842,186, titled "System and Method for Locating and Determining Substance Use", filed Jul. 2, 2013 (the '186 application). The contents of this application are incorporated herein by reference as if set forth in full and priority to this application is claimed to the full extent allowable under U.S. law and regulations.

FIELD OF THE INVENTION

The present invention concerns measuring various levels of substance use, a location, and vital signs. The drugs may be controlled substances, like alcohol or uncontrolled substances like heroin or marijuana. These measurements are taken and communicated to monitoring authorities and/or interested parties.

BACKGROUND

Prison systems are overcrowded with abusers of alcohol and various drugs. These offenders are in prison to control and monitor their abuse of alcohol and various drugs. Current methods of determining alcohol use include Breathalyzer units of various types, some that use electronic testing of blood alcohol levels (BAC) and some that use fuel cell technology to determine blood alcohol levels. Other methods may also be used to determine levels of drug use, for example urine testing.

SUMMARY

Remote monitoring of drug use by these offenders (also known as "users") of either controlled or uncontrolled substances reduces the cost of housing the offenders in the prison system or in a hospital. By providing systems and methods that securely monitor offender drug use at determined remote locations, the need to keep certain of these offenders within the prison systems may be removed, thereby reducing cost. To maintain security of the remote monitoring, the testing device is made foolproof such that collected evidence cannot be faked or altered.

When a patient is in hospital, vital conditions of the patient may be monitored remotely at nurse's stations using one or more sensing devices. Similarly, the systems and methods disclosed herein may also be used to monitor health conditions such that a stay in hospital is avoided, such as where monitoring of a condition by a health professional is needed. The sensors and devices employed may interface to a Smart Phone or the Internet. The invention further provides an ability to monitor offenders or patients vitals or drug levels with their location, since it is also important to know the location of the offender or patient at various intervals or at all times. Certain location devices have waterproof ankle bracelets that are not removable without a signal being sent to the group monitoring these individuals by various methods.

The invention may also just be used to locate an individual for court, commercial, and/or personal use. Prisons also may be depopulated when the offender's location is controlled in the community through monitoring. Monitoring of vitals in real time regardless of location is useful to the health care industry and to others.

In accordance with one aspect of the present invention, a method is provided for locating and determining substance use by a test subject. The method involves sensing a level of the substance within a test sample provided by the test subject, communicating the level and a unique serial number of the testing device to a communication device, determining a location of the test subject, and the sending the level, the location, and the unique serial number from the communication device to a remote server. In this manner, both the substance level and location of a patient, offender, or other individual can be verifiably monitored.

The method may involve monitoring the substance for a controlled or uncontrolled substance. For example, the method may involve providing a breathalyzer to monitor a level of alcohol or marijuana. The location of the test subject is preferably determined at a communication device. In this regard, the communication device may determine location, for example, based on GPS information or a network-based technology such as cell, cell sector, time difference of arrival determinations, angle of arrival determinations, or combinations thereof.

Additional information may be sent from the communication device to the remote server. For example, the communication device may acquire and send biometric information concerning the test subject, security code information identifying the specific test at issue or a photograph including a display of the unique serial number, security code, or the like that can be matched to a digital transmission of the same information. The biometric information may include, for example, an image of at least a portion of the subject's face for facial recognition analysis, an image of the patient's iris, fingerprint information, or the like.

In accordance with another aspect of the present invention, a testing device is provided for determining a substance level within a test subject. The testing device comprises a sensor capable of sensing a substance level within a test sample provided by the test subject, a display capable of displaying visual representation of the substance, and an interface capable of communicating the substance level to a communication device or a vehicle module. For example, the communication device may communicate the information to a remote server for monitoring purposes. The vehicle module may be operative to selectively enable or disable operation of the vehicle depending on the substance level.

In one embodiment, the testing device is designed so that it is compact for storage in a pocket or similar compartment and allows for acquiring image information as may be desired. Such image information may be patient's face, an iris, a display including serial number, security code information, or other image that may be used test verification or some other purpose. In this regard, the testing device may include a housing that is movable between extended and collapsed configurations. In the extended configuration the coupling mechanism positions a camera of the communication device for acquiring an image of a face of the test subject. The camera is preferably positioned at least five inches and, in one implementation, about seven inches from the patient's face. For example, the housing may be hinged such that it flips open or closed to define the extended and retracted configurations.

In accordance with a still further aspect of the present invention, a testing device is provided including a display. More specifically, the testing device includes Ka sensor capable of sensing a substance level within a test sample provided by a test subject; a display capable of displaying a visual representation of test information including at least one the substance level, a testing device identification, a test identification, and biometric information for the test subject; and an interface capable of communicating the test information to a communication device or a vehicle module. In one implementation, the visual representation of the test information is compared to a digital version of the same information for test verification. In other implementations, the test information is compared to stored information for verification or other purposes.

In accordance with a still further aspect of the present invention, a method is provided for operating a communication device in connection with monitoring substance use. The method includes: obtaining, at the communication device, a level of the substance within a test sample provided by a subject; operating the communication device to obtain test verification information correlated to the test sample; and sending the level and the test verification information from the communication device to a remote server. For example, the test verification information may include one of an identification of the testing device, an identification of a test by which the test sample is provided, and biometric information obtained using the communication device. Additionally or alternatively, the test verification information may include a picture of a display of the testing device.

In accordance with another aspect of the present invention, a collapsible testing device is provided for determining a substance in a test subject. The testing device includes a sensor capable of sensing a substance level within a test sample provided by the test subject; an interface capable of communicating the substance level to one of a communication device and a vehicle module; and a coupling mechanism for physically coupling the communication device to the testing device. The testing device includes a housing that is movable between extended and collapsed configurations wherein, in the extended configuration, the coupling mechanism positions a camera of the communication device for acquiring a image of one of a face of the test subject and a display of the testing device. In this manner, the testing device can be moved to the collapsed configuration for compact storage and extended the extended configuration for acquiring images that may be used, for example, for test verification.

BRIEF DESCRIPTION OF THE FIGURES

FIG. 5 shows one exemplary BAC web application report generated by the web application of the server of FIG. 1.

DETAILED DESCRIPTION

An example of a blood alcohol monitoring and tracking is shown in FIGS. 1 through 7 as an embodiment of the invention. Other substances may be monitored without departing from the scope hereof.

Figure 1:
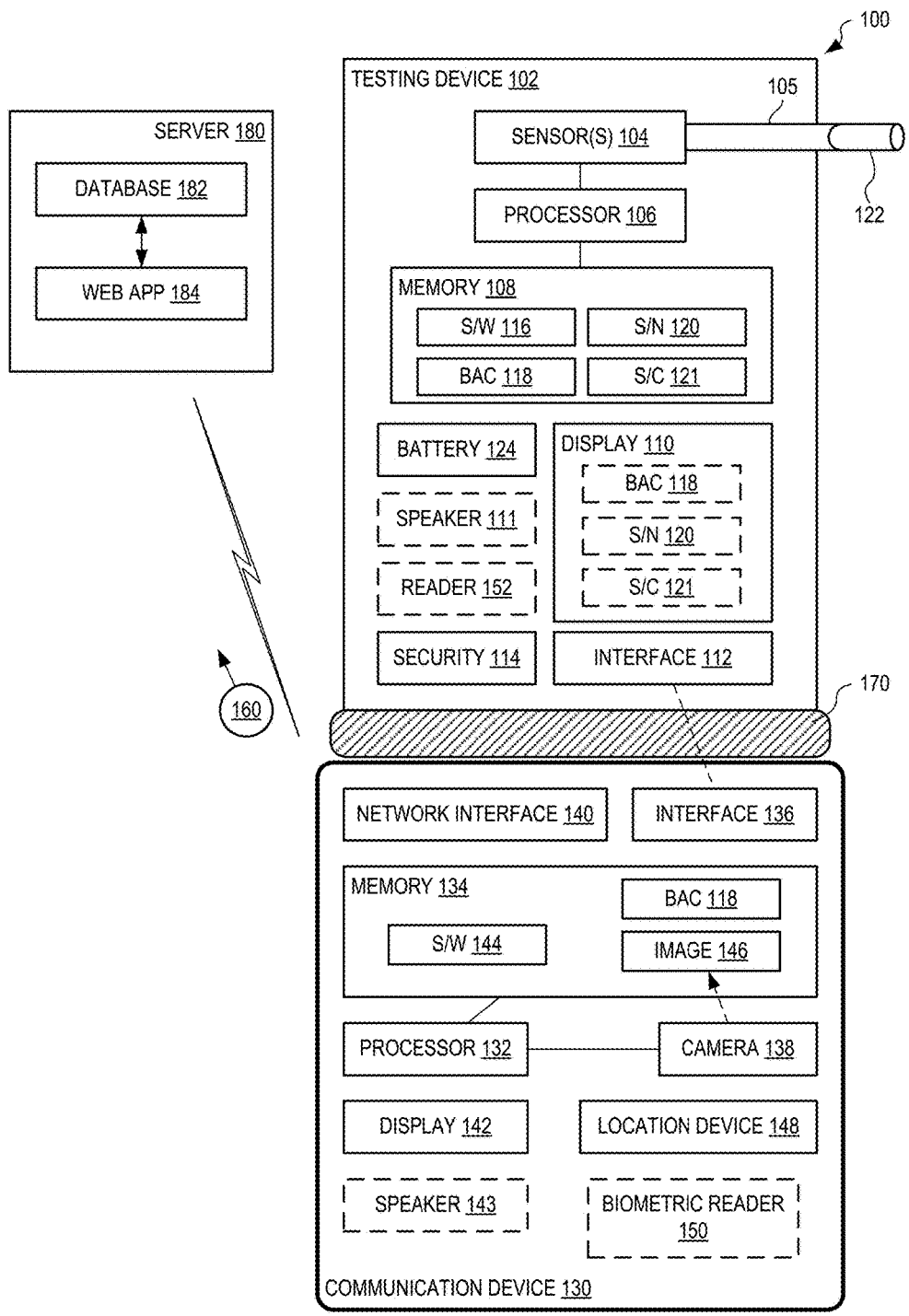
FIG. 1 shows one exemplary system for locating and determining substance use, in an embodiment.

FIG. 1 specifically shows one exemplary system 100 for locating and determining use of controlled and uncontrolled substances by a test subject. System 100 includes a testing device 102 that automatically senses a condition of the test subject. Testing device 102 includes one or more sensors 104, a processor 106, a memory 108, a display 110, a secure interface 112, and a battery 124. Optionally, testing device 102 includes a security unit 114 for monitoring integrity of testing device 102 and indicating whether testing device 102 has been compromised (e.g., opened and/or tampered with). Battery 124 is selected to be of a common type with a long life and that is easily replaceable. The battery may be rechargeable and the system 100 may include an appropriate recharging port. Calibration of testing device 102 is quick and simple.

In one embodiment, sensor 104 detects Breath Alcohol Concentration (BAC) and is for example implemented using fuel cell technology. Testing device 102 thus operates as a Breathalyzer and includes a tube 105 that is coupled with sensor 104 and a distal portion 122 coupled with tube 105 and into which the test subject blows. Base portion of tube 105 is permanently coupled with testing device 102 to prevent tampering and a distal portion 122 is replaceable.

Testing device 102 includes software 116, stored within memory 108, having machine readable instructions that when executed by processor 106 control sensor 104 to measure BAC value 118. BAC value 118 is stored in memory 108 and displayed on display 110, as illustratively shown in dashed outline. Software 116 may also include instructions for operating testing device 102 that are displayed on display 110. Security unit 114 may include a serial number 120 (shown stored within memory 108) and an integrity indication (e.g., from security unit 114) that are also displayed on display 110 to indicate authenticity of the measured BAC value 118.

Testing device 102 also includes an interface 112 that couples with a mobile communication device 130. Communication device 130 represents any device that incorporates wireless (e.g., cellular, Wi-Fi) communication, and one or more of processing capability, interface capability, location capability, and that may include any or all of a processor, interface, memory, a location device (e.g., GPS), a camera, and display capability. Although embodiments described below advantageously use camera and location features available in many communication devices, as well as user interface screens displayed on the device, it will be appreciated that there may be scenarios where the communication device primarily functions to forward information from the testing device (with or without location or other communication device generated information) with minimal or no visual or other user interface. For example, tests by the testing device may be timed or initiated automatically in response to trigger signals from a server without requiring user interaction with a user interface. This may be desirable, for example, to reduce power consumption and extend battery life of the communication device. Communication device 130 is shown with a processor 132, a memory 134, an interface 136, a camera 138, a network interface 140 (e.g., wired or wireless interface), and a display 142. Display 142 is for example a touch screen that allows a user of device 130 to make selections. Network interface 140 represents a wireless transceiver for communicating with a cellular communication network or WIFI network for example. Interface 112 of testing device 102 and interface 136 of communication device 130 communicate with one another and may represent either a wired electrical interface (e.g., using a physical plug and socket) or a wireless interface (e.g., wireless transceivers that implement Bluetooth or other similar wireless protocols). Testing device 102 may include a flow meter or other device known in the art of Breathalyzers for determining that a full breath has been applied through tube 105.

Testing device 102 also includes a physical coupling mechanism 170 (that may include interface 112 when interface 112 is implemented as a physical connector) for physically coupling with communication device 130. Communication device 130 is for example one of an iPhone and an Android smart phone that is capable of determining its location (e.g., using a GPS receiver or other location determining device) and wherein camera 138 is front facing. When physically coupled together, testing device 102 and communication device 130 are oriented such that camera 138 has a field of view to capture a face image 146 of the test subject providing a sample into tube 105 of testing device 102. In one embodiment, the image is a plurality of images captured periodically during the provision of the sample. In particular, testing device 102 is configured such that, when physically coupled with communication device 130, tube 105, distal portion 122 and display 110 are visible within image 146 captured by camera 138. Further, testing device 102 is configured such that camera 138 also captures image 146 to include a front view of the face of the test subject providing a breath sample into tube 105.

Upon completion of a measurement, BAC value 118 and at least serial number 120 are communicated as digital values from testing device 102 to communication device 130 via interface 112 and interface 136.

Testing device 102 is controlled from communication device 130 via interface 112 and interface 136. Software 144, stored within memory 134 of communication device 130, includes machine readable instructions that when executed by processor 132 interact with testing device 102 to control sensing of BAC value 118 within a breath sample and transfer of BAC value 118 to memory 134.

In one embodiment, communication device 130 includes a biometric reader 150 that is utilized by software 144 to obtain a biometric image (e.g., a finger print, a retinal scan, and so on) of the test subject, wherein the biometric image may be used to provide alternative or additional verification of the identity of the test subject. In another embodiment, testing device 102 includes a biometric reader 152 that is utilized by software 116 to capture a biometric image of the test subject, wherein the biometric image is used to provide additional verification of the identity of the test subject.

Figure 2:
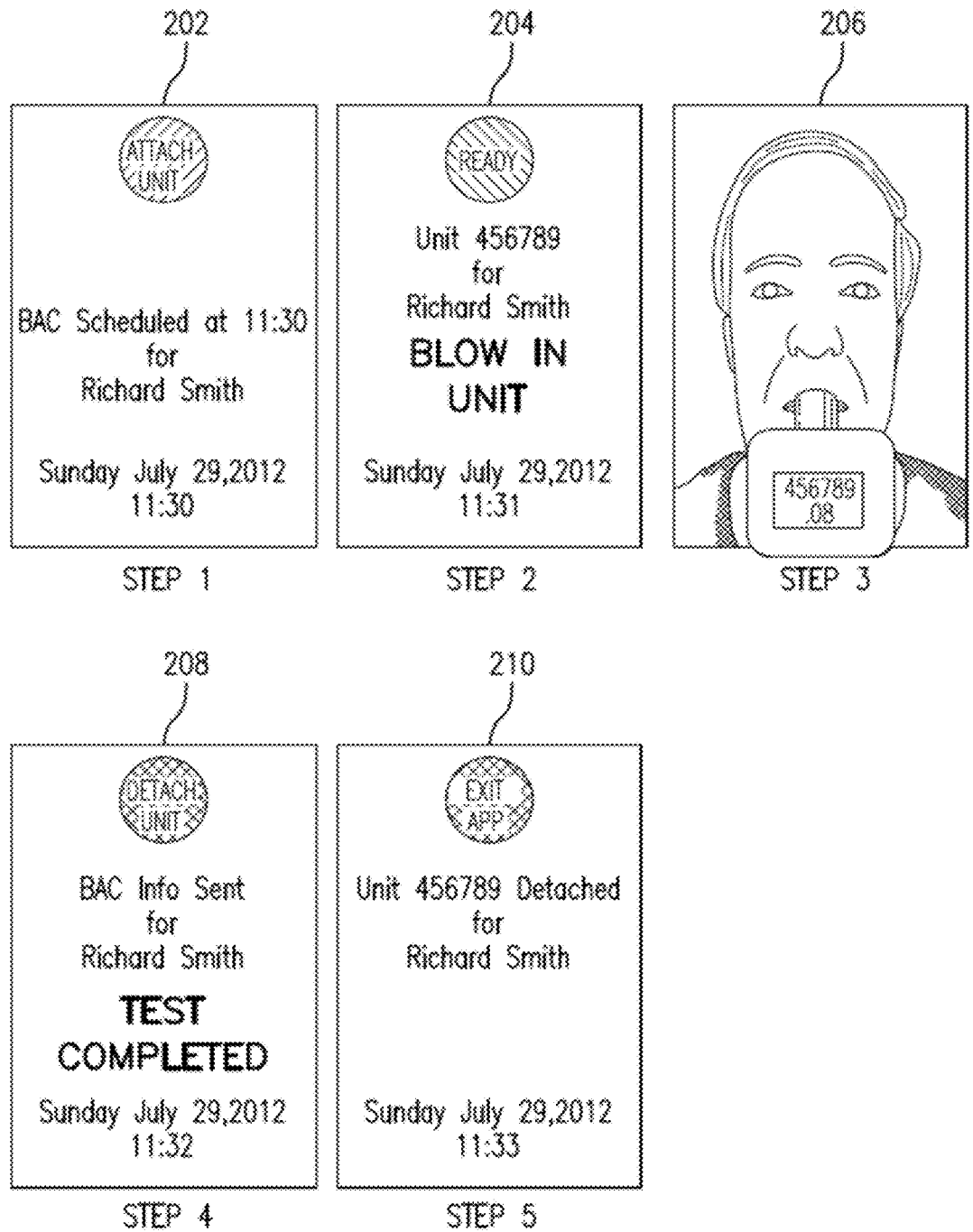
FIG. 2 shows exemplary screen shots from the system of FIG. 1 during use.

In one example of operation, a test subject is required to provide between four and six BAC values throughout each day. Software 144 is thereby configured to instruct the test subject to provide a sample at the appropriate times. For example, as shown in steps 1 through 5 of FIG. 2, software 144 provides instructions to the test subject to perform the test and then generates a message 160 containing at least BAC value 118 and image 146. Optionally message 160 also includes one or more of location information, determined from location device 148 for example, that defines a location of where the measurement was performed, and serial number 120 of testing device 102. In particular, FIG. 2 shows: a screenshot 202 of display 142 of communication device 130 shows step 1 which indicates that the user is scheduled for a BAC test at a specific time and date with instructions to attach the BAC testing device 102 to communication device 130. A screenshot 204 of display 142 of communication device 130 shows step 2 that indicates that testing device 102 is communicating with communication device 130 (using either Bluetooth or some other means via interfaces 112 and 136) and that testing device 102 is ready to measure BAC, and displays instructions for the test subject to blow into tube 105. A screenshot 206 of display 142 of communication device 130 shows step 3 displaying image 146 taken of the test subject blowing into testing device 102 and including a view of display 110 showing BAC value 118 and serial number 120 of testing device 102. BAC value 118, serial number 120, and image 146 captured digitally for dissemination to a server 180 via communication device 130 under control of software 144. For example, software 144, executed by processor 132 generates and sends message 160, including a GPS location, to server 180. One or more of web application 184, software 144 and software 116 includes facial recognition functionality for automatically recognizing the face of the test subject within image 146 based upon stored images of the test subject within database 182, wherein an alert may be automatically generated and sent to an administrator and/or operator of system 100 if the face of the test subject is not recognized. Thus, the alert may indicate possible fraudulent use of testing device 102.

Where system 100 includes one or both of biometric readers 150 and 152, the captured biometric image may also be included within message 160, wherein web application 184 of server 180 may implement additional validation of the test subject based upon the biometric image and a master biometric image stored within database 182 in association with the test subject, for example. Where the biometric image does not match the master biometric image, web application 184 may generate an alert to an administrator and/or operator of system 100. Thus, the alert may indicate the possibility of fraudulent use of testing device 102.

A screenshot 208 of display 142 of communication device 130 shows step 4 that indicates that the information has been sent successfully to server 180 and that the test is complete. Testing device 102 may then be detached from communication device 130. A screenshot 210 of display 142 of communication device 130 shows step 5 that indicates that testing device 102 has been detached from communication device 130.

Optionally, one or both of testing device 102 and communication device 130 includes a speaker 111, 143 that under control of software 116, 144, respectively, may generate audio to alert the test subject. For example, web application 184 may send a message to communication device 130 that causes speaker 143 to generate a sound, for example to remind the test subject that a next test is overdue. In another example of operation, upon receiving a message from web application 184, communication device 130 sends a message to testing device 102 causing speaker 111 to generate a sound. Thus, system 100 allows a monitoring authority, via one or both of web application 184 and/or communication device 130, to audibly notify the test subject of an overdue test or to request a random sampling for example.

Communication device 130, under control of software 144, sends message 160 to a server 180 where BAC value 118 and image 146 are processed by a web application 184. Web application 184 is for example a software based control process running within server 180 that automatically processes message 160 against stored requirements of the test subject. In one example of operation, web application 184 may generate a notification (e.g., to an external organization) when message 160 was not received within an expected time window. In another example, when message 160 is received, web application 184 automatically checks that BAC value 118 is below a required threshold for the test subject and then validates the measurement using image 146. Web application 184 may also check other parameters, such as location, within message 160 against permitted values to determine when the test subject is in violation of an agreement and/or requirement.

In one embodiment, for each operation of testing device 102 receives a security code (S/C) 121 that is a randomly generated number from server 180 and stored S/C 121 within memory 108. S/C 121 is displayed on display 110 such that it is captured within image 146 by camera 138 of communication device 130, and optionally added to message 160. Use of S/C/121 prevents fraudulent use of testing device 102 since S/C 121 cannot be predicted and is generated for each use of testing device 102.

In another embodiment, security unit 114 (or software 116) includes a pseudo random number generator that generates S/C 121 that appears to be random to the test subject. In this embodiment, security unit 114 generates a next number in the sequence for each use of testing device 102, where the same sequence of numbers generated by security unit 114 is also generated within server 180 and thereby allows server 180 to validate each use of testing device 102 to detect misuse thereof. For example, upon receiving message 146, web application 184 automatically detects and recognizes S/C 121 within image 146 and compares the recognized value against the generated (or predicted) S/C 121 and generates a notification when there is a mismatch. Thus, potential misuse (e.g., where the test subject attempts to reuse a previously determined BAC value and image or attempts to use a testing device assigned to another test subject) of testing device 102 is quickly identified.

Figure 18:
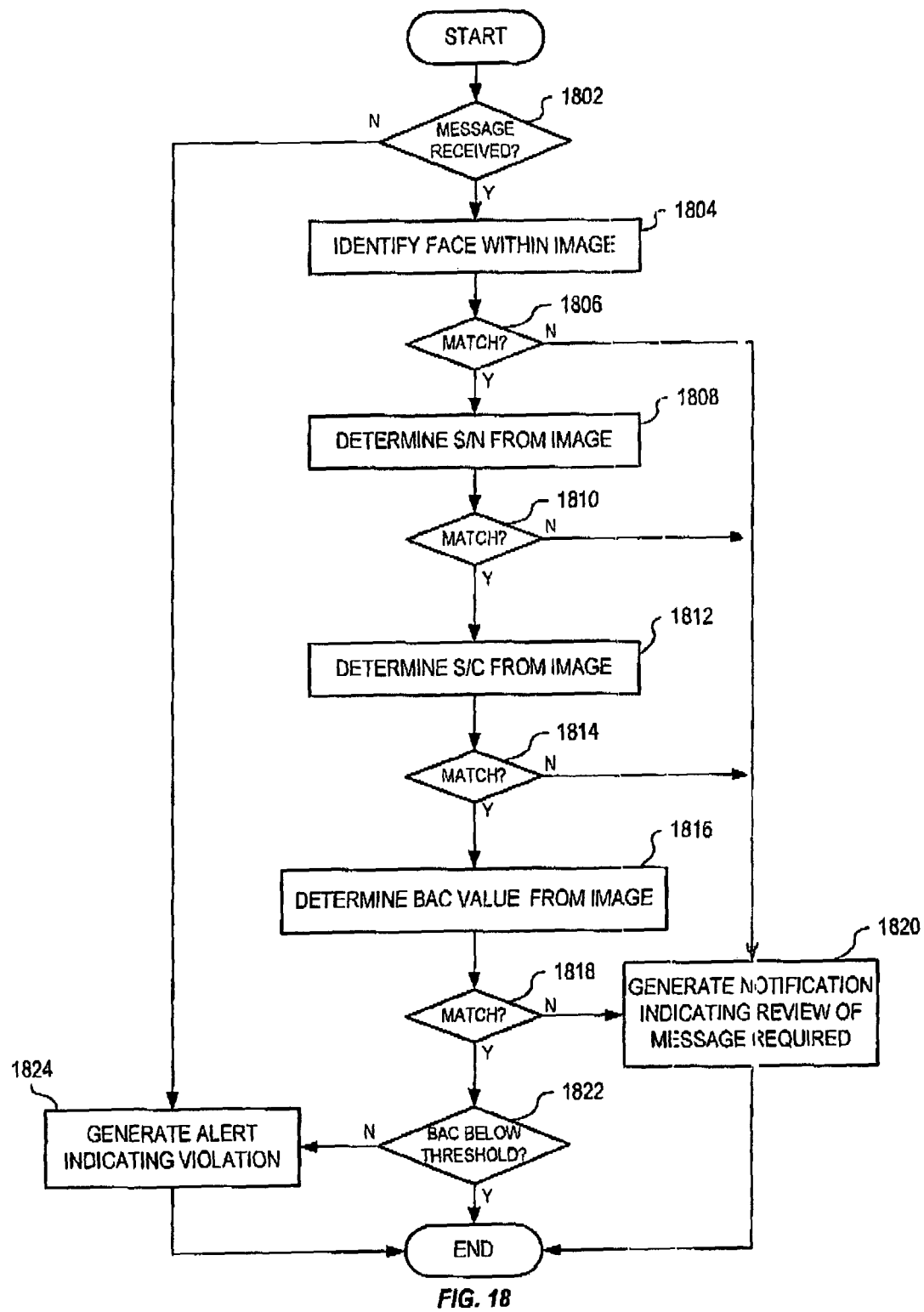
FIG. 18 is a flowchart illustrating one exemplary method for automatically processing information contained within the message of FIG. 1, in an embodiment.

FIG. 18 is a flowchart illustrating one exemplary method for automatically processing information contained within the message of FIG. 1. Method 1800 is for example implemented within web application 184 of server 180 and invoked when testing of a subject is due.

Step 1802 is a decision. If, in step 1802, method 1800 determines that a message has been received, method 1800 continues with step 1804; otherwise method 1800 continues with step 1824. In one example of step 1802, method 1800 continues with step 1804 when message 160 is received within server 180 from communication device 130.

In step 1804, method 1800 identifies a face within an image of the message. In one example of step 1804, web application 184 identifies a face within image 146 received in message 160. Step 1806 is a decision. If, in step 1806, the identified face matches a stored face of the test subject, method 1800 continues with step 1808; otherwise method 1800 continues with step 1820.

In step 1808, method 1800 identifies a serial number within the image. In one example of step 1808, web application 184 identifies a serial number within image 146. Step 1810 is a decision. If, in step 1810, the identified serial number matches the serial number (e.g., S/N 120) stored within database 182 in association with the test subject, method 1800 continues with step 1812; otherwise method 1800 continues with step 1820.

In step 1812, method 1800 identifies a security code within the image. In one example of step 1812, web application 184 identifies a security code within image 146. Step 1814 is a decision. If, in step 1814, the identified security code matches the security code (e.g., S/C 121) associated with the test subject, method 1800 continues with step 1816; otherwise method 1800 continues with step 1820.

In step 1816, method 1800 identifies a BAC value within the image. In one example of step 1816, web application 184 identifies a BAC value within image 146. Step 1818 is a decision. If, in step 1818, the identified BAC value matches the BAC value (e.g., BAC value 118) received in the message (e.g., message 160), method 1800 continues with step 1822; otherwise method 1800 continues with step 1820.

In step 1820, method 1800 generates a notification indicating a review of the message is required. In one example of step 1820, web application 184 generates a notification to an administrator and/or official associated with the test subject indicating that further review of message 160 is required. Method 1800 then terminates.

Step 1822 is a decision. If, in step 1822, method 1800 determines that the BAC value is below a defined threshold, method 1800 terminates; otherwise method 1800 continues with step 1824. In one example of step 1822, web application compares BAC value 118 against a defined threshold within database 182 and continues with step 1824 if BAC value 118 is above the defined threshold.

In step 1824, method 1800 generates an alert indicating a violation. In one example of step 1824, web application 184 generates a message indication violation of substance abuse control and sends the message to an administrator and/or official associated with the test subject or authorizes another sample to be taken and/or other information. Method 1800 then terminates.

In one example of use, a court requires that an offender provide a BAC level at predefined intervals throughout the day. Software 144 is configured to remind the offender to provide a BAC level when directed. Upon receiving each sample, web application 184 evaluates the measured BAC value 118 and then processes image 146 to ensure that the sample from which the BAC was measured was provided by the offender.

By providing an automated tamper proof and secure means of BAC measurement, authorities are only alerted when a violation of the BAC is measured or when incorrect or no evidence is presented for authentication. For example, if a test subject fails to send a message 160 to web application 184, an alarm may be raised with authorities. In another example, BAC value 118 has a value of 0.02 when required to be less than 0.01, wherein web application 184 generates and sends an alert to the authorities.

Figure 3:
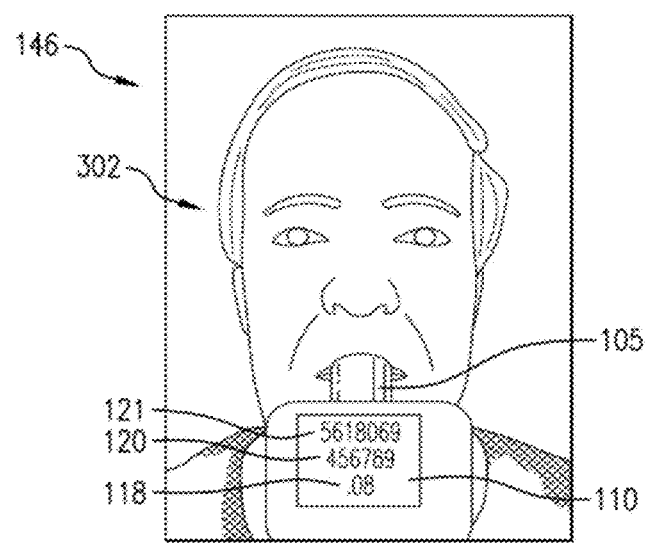
FIG. 3 shows an exemplary image, captured by the communication device of FIG. 1 during the BAC measurement, and illustrating a test subject, the tube, and the display showing a security code, the measured BAC value, and the serial number of the testing device.

FIG. 3 shows image 146, captured by communication device 130 during measurement of BAC value 118, and illustrating test subject 302, tube 105, and display 110. In particular, within image 146, display 110 is displaying S/C 121, BAC value 118 and serial number 120. Physical coupling between testing device 102 and communication device 130 positions camera 138 to consistently capture the face of test subject 302, tube 105, BAC value 118 and serial number 120 within image 146 during operation of testing device 102. The physical coupling is preferably configured such that the camera captures enough of the user's face for verification of identity, e.g., by facial recognition software. In this regard, the illustrated system can generally capture all of the user's face above the upper lip of the user. Further, communication between software 144 of communication device 130 and software 116 of testing device 102 coordinates capture of image 146 with measurement of BAC value 118, thereby ensuring that image 146 provides strong evidence of authenticity of BAC value 118 (i.e., that BAC value 118 corresponds to the test subject captured within image 146).

Figure 4:
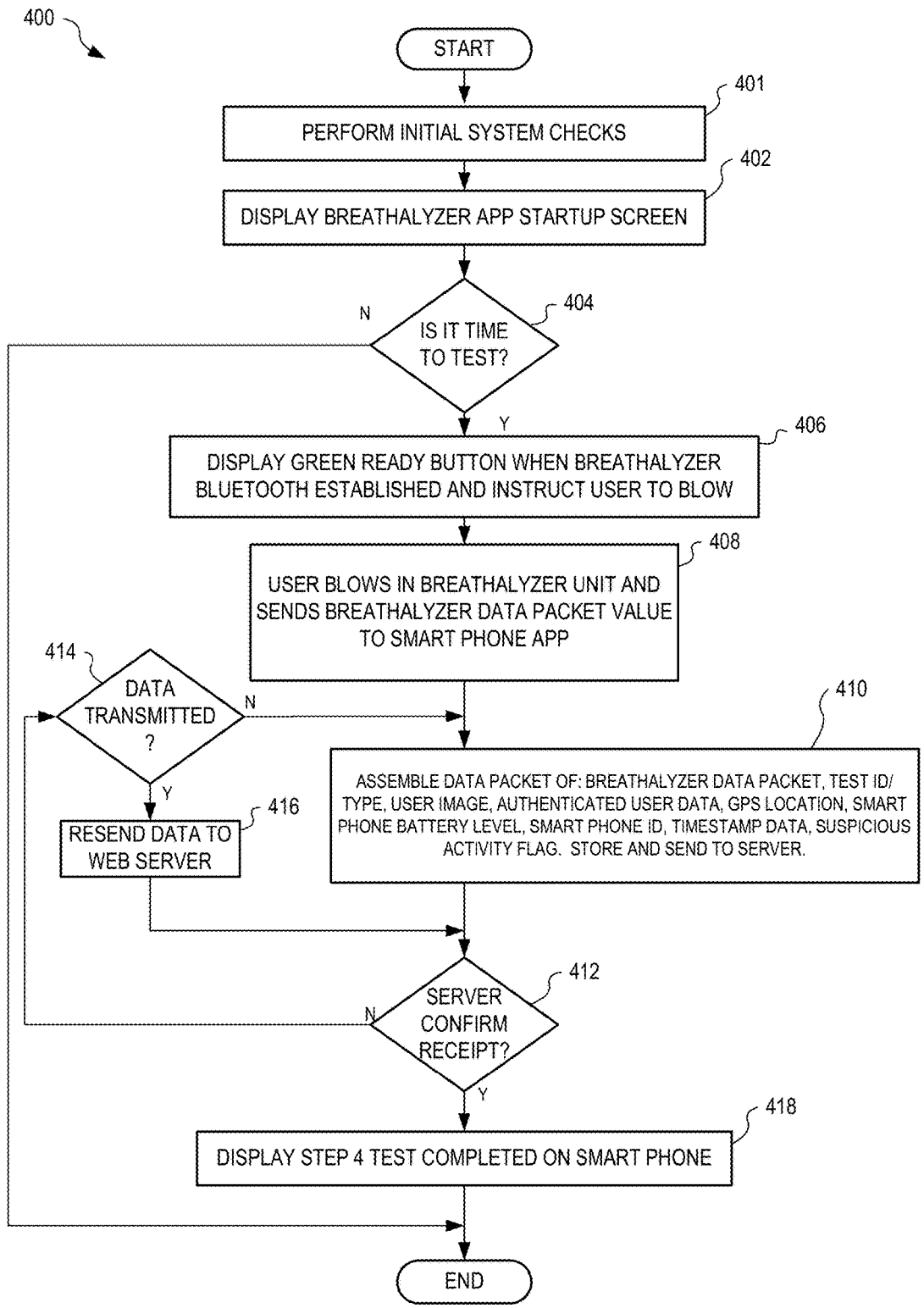
FIG. 4 is a flowchart illustrating one exemplary method for locating and determining substance use, in an embodiment.

FIG. 4 is a flowchart illustrating one exemplary method 400 for locating and determining use of controlled and uncontrolled substances. Method 400 is implemented within software 144 of communication device 130 and software 116 of testing device 102 for example. In step 401, a number of initial system checks may be performed. The system first checks to see if Bluetooth and Location services are enabled. If not, the user is prompted to enable them and the system exits if they are not immediately enabled. The system also checks to see if it can take control of the front facing camera. If it fails after several tries the user is informed of the problem and the system exits. In addition, the system may check for a user profile and network connection. If no profile exists and the network is not available, the user is notified and the system exits. The system may also check for a stored Bluetooth device profile. If it does not exist, the system asks the user to select a paired device or pair a new device. If it does exist, a test screen is displayed. At any point until the data packet has been received from the test device, the user may press a button to select/pair a different Bluetooth device.

In step 402, method 400 displays a startup screen. In one example of step 402, software 144 displays screenshot 202 on display 142. If all of the initial system checks discussed above are satisfied, the system may proceed to step 404. Step 404 is a decision. If, in step 404, method 400 determines that it is not time to test, method 400 terminates; otherwise, method 400 continues with step 406. The time to test may correspond to a scheduled or an unscheduled test. In one example of step 404, where software 144 has been initiated before a defined testing time window, method 400 terminates.

In step 406, method 400 displays a green ready button when communication is established between the communication device and the testing device. In one example of step 406, software 144 displays screenshot 204 on display 142 when communication has been established between communication device 130 and testing device 102 via interfaces 112 and 136. In step 408, method 400 determines a BAC value as the test subject blows into the testing device. In one example of step 408, testing device 102 senses, using sensor 104, breath as test subject blows into tube 105, determines BAC value 118, and then sends BAC value in a breathalyzer data packet 118 and serial number 120 to communication device 130 via interface 112 and interface 136. The breathalyzer data packet may include the BAC value 118. A BAC ID (e.g., security code and serial number), visual confirmation code, battery level, and timing/calibration information.

In step 410, method 400 receives and assembles a data packet of Authenticated User Data, GPS Location, Smart Phone Battery Level, Smart Phone ID, Timestamp Data, and Suspicious Activity Flag, stores the data packet in the memory of the communication device, and sends the data packet to a web application. In one example of step 410, software 144 receives at least BAC value 118 and serial number 120 from testing device 102, controls camera 138 to capture image 146 and creates message 160 containing at least BAC value 118, serial number 120, image 146. Optionally, software 144 also controls location device 148 to determine a current location, and includes the determined current location within message 160. Optionally, software 144 may also include a MAC address of communication device 130, a current time and date, identification of the test subject and a password (previously configured within software 144 and/or memory 134). The system may generate and display (e.g., by LED or LCD) a randomized security code for each test. In this manner, a user is substantially prevented from submitting a false sample from another person or source as the presence of the user can be verified at the time of the test. Software 144 then sends message 160 to server 180 for processing by web application 184.

At least part of the information within message 160 may also be encrypted without departing from the scope hereof. Further, information stored within memory 134 may also be encrypted to prevent duplication and/or modification.

The server may confirm receipt of the data packet and further respond with information regarding the next test. If the next test information is new, it is added to the set of scheduled tests. Step 412 is a decision. If, in step 412, method 400 determines that the web server application has not confirmed receipt of the data packet, method 400 continues with step 414; otherwise, method 400 continues with step 418. Step 414 is a decision. If, in step 414, method 400 determines that the data packet has not been transmitted, method continues with step 410; otherwise method continues with step 416. In step 416, method 400 resends the data packet to the web server. In one example of step 416, software 144 resends message 160 to server 180 in this regard.

In step 418, method 400 displays a message indicating that the test is complete. In one example of step 418, software 144 displays screenshot 208 to indicate that the test is complete and that the test subject may disconnect testing device 102 from communication device 130. No matter how the process 400 ends, the system always schedules the next alert (assuming at least one alert remains).

FIG. 5 shows one exemplary BAC web application report 500 generated by web application 184 of server 180 for example. Report 500 is shown containing: an image, name, address, and description of the test subject; a calendar; court and/or other relevant personal information; and detail of tests received from system 100, where each detailed item includes date and time, location, and BAC level of the test. Although FIG. 5 references SMS messages, such messages can be provided by local/push notifications. Notifications of failed or missed tests can be provided by SMS, email, or local/post notifications.

Figure 6:
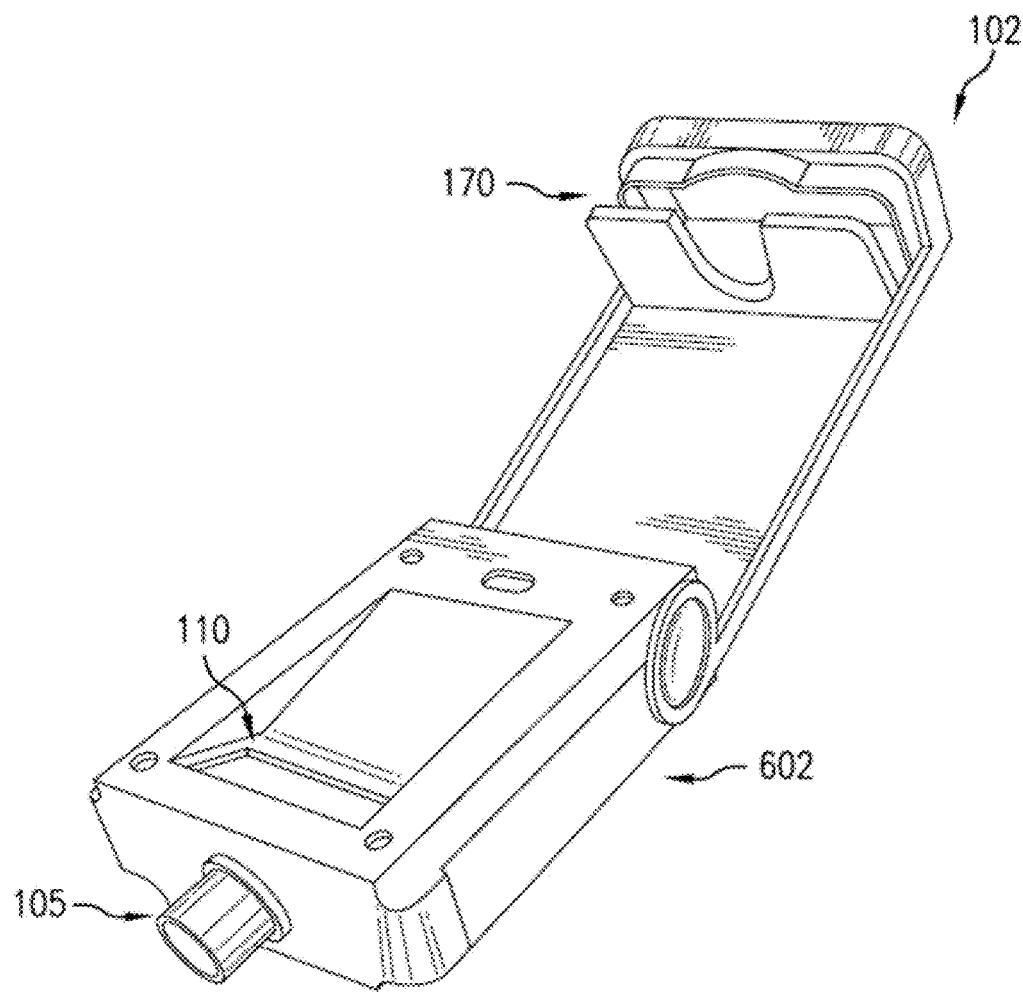
FIG. 6 shows one exemplary physical embodiment of the testing device of FIG. 1 illustrating a casing with the tube and the physical coupling mechanism.

FIG. 6 shows one exemplary physical embodiment of testing device 102 illustrating a casing 602 with tube 105 and physical coupling mechanism 170. As shown, physical coupling mechanism 170 is a cradle that positions communication device 130 such that camera 138 captures a face image of the test subject when blowing into tube 105. As described above, the captured image also includes display 110 indicating serial number 120 and security code 121. Although FIG. 3 shows the display as further including a BAC value 118, in many cases it will not be desired to display the BAC value to the user and this display element may be eliminated.

In one embodiment, testing device 102 is collapsible to facilitate storage and portability, and to provide protection of certain parts of testing device 102. As shown in FIG. 6, the testing device 102 includes a central pivot such that the device flips between open and closed configurations. In the closed configuration, the device 102 easily fits into a user's pocket. In the open configuration, the physical coupling mechanism 170 positions the camera far enough away from the user's face (i.e., at least about 5 inches, for example, preferably, about 7 inches in the illustrated embodiment) to capture an image as the user supplies a sample at tube 105. A button release allows the device 102 to open smoothly without flopping or a jerky motion as may occur under spring control.

Figure 7:
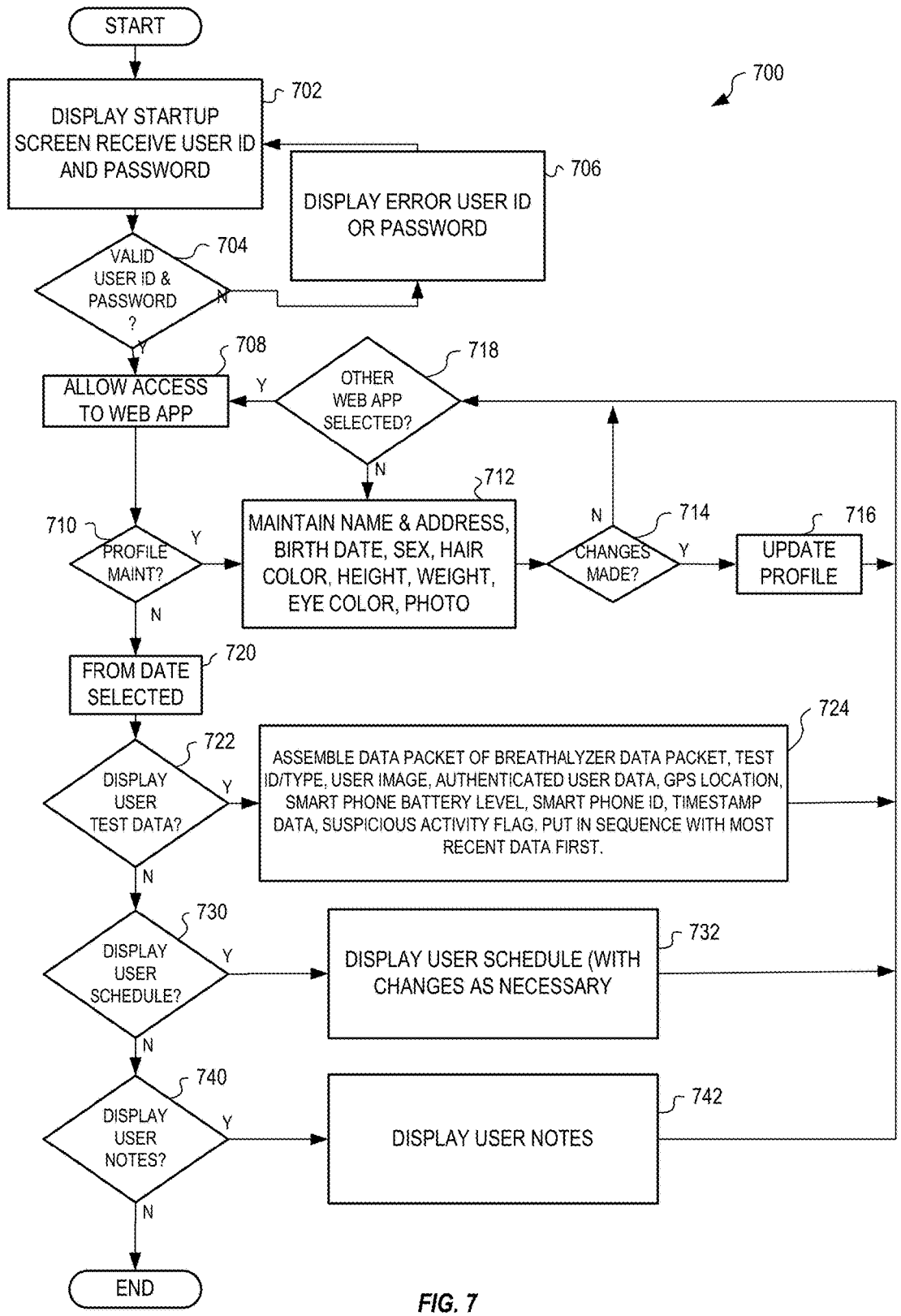
FIG. 7 is a flowchart illustrating one exemplary method for automatically receiving and automatically processing information contained within the message of FIG. 1, in an embodiment.

FIG. 7 is a flowchart illustrating one exemplary method 700 for automatically receiving and automatically processing information contained within message 160 of FIG. 1. Method 700 is implemented within web application 184 of server 180, for example.

It will be appreciated that the method 700 implemented by the web application 184 and/or other software/logic may include a number of maintenance and housekeeping functions that are not shown in FIG. 7. For example, the process 700 may further include change password and create new profile functionality. The process 700 may also include device maintenance, login maintenance and agency maintenance functionality. The application may also manage a To Do list, for example, relating to test data requiring resolution.

Steps 702 through 706 of method 700 prevent unauthorized access to the functionality of steps 708 through 742 by requiring the user to log in. Steps 710 through 718 implement profile maintenance if the user selects the option to edit the profile. In step 712, a user may configure a profile for the test subject. In one example of step 712, a profile is configured within server 180 and stored within database 182 in step 716. In step 720, method 700 receives a selected date. Steps 722 and 724 allow the user to display received and/or stored data packed. In one example of step 724, the user of web application 184 displays message 160 as BAC web application report 500 of FIG. 5.

Steps 730 and 732 allow the user to display a schedule of the test subject. The displayed test schedule may be modified based on any new test scheduling information. Steps 740 and 742 allow the user to display user notes. These user notes may be used to provide the examiner of captured results with more information about circumstances surrounding a particular drug test or user situation, such as where a drug test has been missed. This is particularly important where system 100 is used for court monitored situations. Although not shown, the system may also display assigned devices and notification contacts.

In another embodiment, testing device 102 and communication device 130 communicate with a vehicle ignition system, wherein the vehicle is inoperable until the test subject provides a breath sample with satisfactory BAC value 118. This also provides rolling tests periodically during vehicle operation. All tests are communicated through the communication device 130 (e.g., by sending message 160) to server 180.

Web application 184 may for example display a template photo of the test subject, taken at the time of enrollment of the test subject, and, for each received test result, display image 146, a scheduled test date and time, a received test date and time, a BAC, a status, and any notes. The user of web application 184 may thereby verify that the test subject has correctly taken the BAC test. Web application 184 may also sort information for display by one or more of: group, positive tests, and missed tests.

Ankle Bracelet

Figure 8:
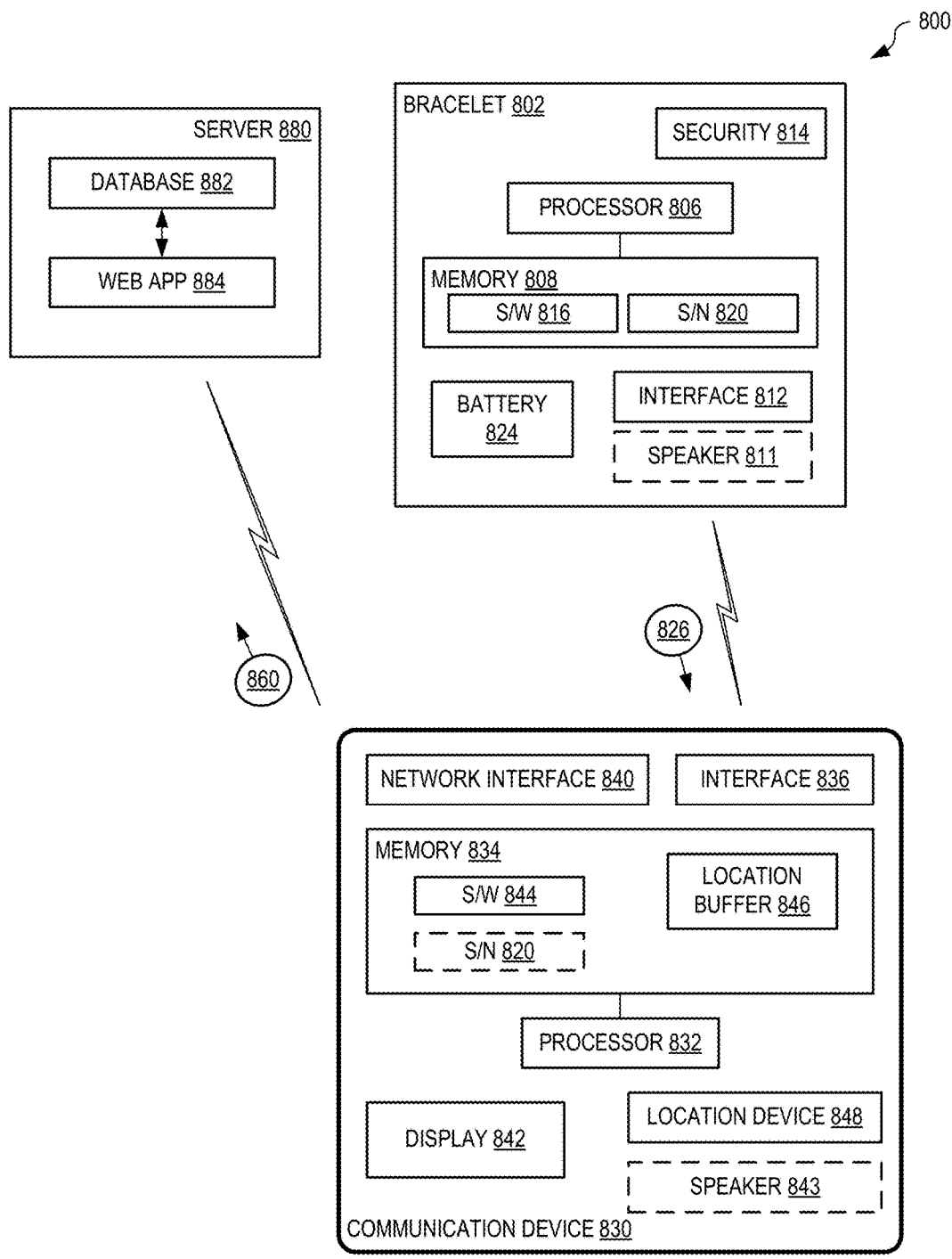
FIG. 8 shows one exemplary system for automatically monitoring movement of an individual, in an embodiment.
Figure 9:
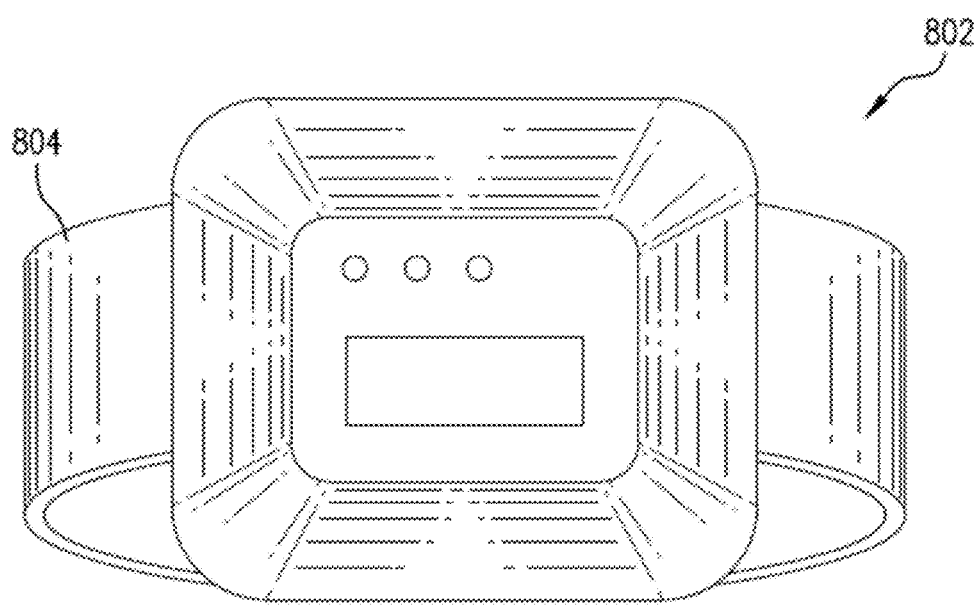
FIG. 9 shows one exemplary perspective view of the ankle bracelet of FIG. 8, in an embodiment.

FIG. 8 shows one exemplary system 800 for automatically monitoring movement of an individual. System 800 includes an ankle bracelet 802 that communicates with a communication device 830 to report the presence of the individual attached thereto. Communication device 830 is for example similar to communication device 130 of FIG. 1 and may represent a smart phone or other similar device that includes cellular communication, a location device (e.g., GPS) and one or more of a processor, an interface, a memory, and display capability (e.g., a user interface). FIG. 9 shows one exemplary perspective view of ankle bracelet 802 of FIG. 8, in an embodiment.

Ankle bracelet 802 includes a tamper evident clip that is destroyed when removal is attempted. Bracelet 802 may include an embedded fiber optic cable, thin copper wire, or other tamper prevention device, within its strap 804 that connects with a security circuit 814 to detect when bracelet 802 is removed, wherein security circuit 814 generates and sends a message 826, via interface 812, to communication device 830 indicating any attempted removal. Communication device 830 then immediately generates and sends (via a network interface 840) a message 860 indicating the removal of bracelet 802 to a web application 884 running on a server 880. Interface 812 is a wireless transceiver that implements a Bluetooth protocol for example. Polling between bracelet 802 and communication device 830 may be individually configured (e.g., between 1 second to 60 minutes), depending on the setting and may be defined by web application 884 for example. If communication device 830 does not receive a signal from bracelet 802 periodically, software 844 running within communication device 830 generates and sends message 860 to web application 884 to indicate the communication failure between bracelet 802 and communication device 830.

Bracelet 802 includes a battery 824 that lasts for up to 12 months for example. The battery may be rechargeable. Alternatively, a replacement battery may be used wherein exchange of the battery within bracelet 802 must be accomplished within one minute or bracelet 802 sends a message 826 to communication device 830 indicating an alarm condition. Each bracelet 802 includes a unique serial number 820 that is stored within memory 834 of communication device 830 when bracelet 802 is paired with communication device 830. Bracelet 802 is for example also waterproof or water resistant.

Optionally, one or both of bracelet 802 and communication device 830 includes a speaker 811, 843 that under control of software 816, 844, respectively, may generate audio to alert the individual. For example, web application 884 may send a message to communication device 830 that causes speaker 843 to generate a sound, for example to remind the individual of an approaching boundary. In another example of operation, upon receiving a message from web application 884, communication device 830 sends a message to bracelet 802 causing speaker 811 to generate a sound. Thus, system 800 allows a monitoring authority, via one or both of web application 884 and/or communication device 830, to audibly notify the individual of inclusion and exclusion restrictions imposed by the monitoring authority for example.

Figure 10:
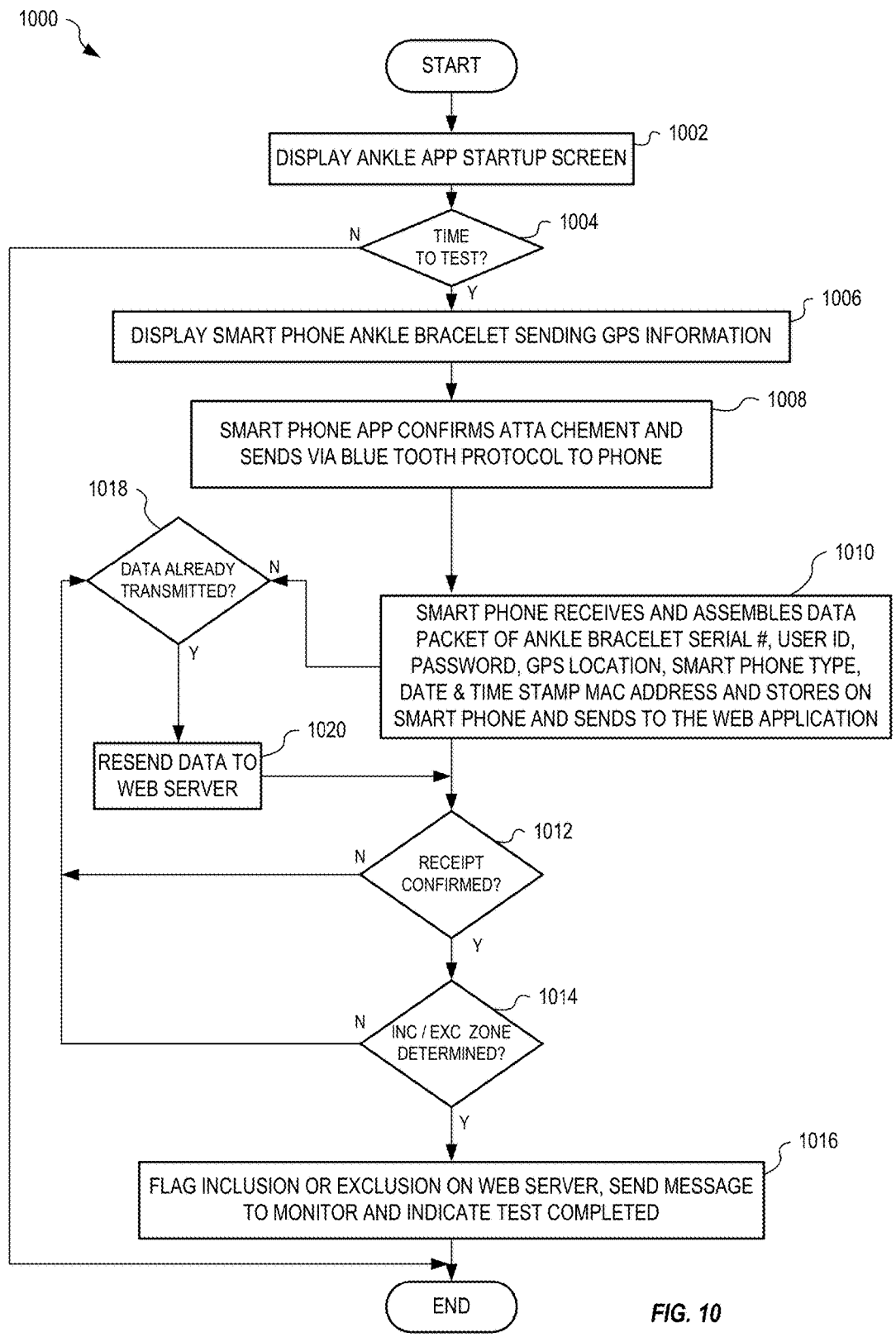
FIG. 10 is a flowchart illustrating one exemplary method for monitoring movement of an individual, in an embodiment.

FIG. 10 is a flowchart illustrating one exemplary method 1000 for monitoring movement of an individual. Steps 1002-1012 and 1016-1020 of method 1000 are for example implemented within software 844 of communication device 830 and step 1014 is implemented within server 880.

In step 1002, method 1000 displays an ankle bracelet application start-up screen. In one example of step 1002, software 844 displays a start-up screen indicating operation of software 844. Step 1004 is a decision. If, in step 1004, method 1000 determines that it is time to test, method 1000 continues with step 1006; otherwise, method 1000 terminates.

In step 1006, method 1000 displays an indication that the communication device is sending location information. In one example of step 1006, software 844 sends a message 860 containing location information, determined from location device 848, to server 880 and displays an indication of the location transfer on display 842. In an alternate embodiment, bracelet 802 also includes a location device for determining a current location of the bracelet, wherein the current location is also communicated to communication device 830 periodically. In step 1008, method 1000 confirms attachment of bracelet 802 to the individual wirelessly with the communication device. In one example of step 1008, bracelet 802 sends message 826 to mobile device 830, via interfaces 812 and 836, to indicate presence and integrity (and thereby attachment of bracelet 802 to the individual) of bracelet 802. Communication device 830, upon receiving message 826, thereby confirms attachment and presence of bracelet 802 to the individual.

In step 1010, method 1000 assembles a data packet containing a serial number of the bracelet, a user Id, a password, a location, a communication device type, a date and time stamp, and a MAC address of the communication device. The communication device then stores the data packet and sends a message containing the data packet to a server. In one example of step 1010, software 844 generates message 860 to include serial number 820 of bracelet 802, location information from location device 848, a date and time stamp from a real time clock of communication device 830, and a MAC address of communication device 830. The timestamp within message 860 is compared to the server time and an alarm may be raised when the timestamp is not within certain limits of the server time. In one embodiment, communication device 830 automatically sets its date a time, wherein web application 884 is notified by software 844 when this feature is turned off or overridden, as this may indicate that the individual is tampering with the communication device to defeat the system integrity.

Step 1012 is a decision. If, in step 1012, method 1000 determines that the server confirms receipt of the data, method 1000 continues with step 1014; otherwise, method 1000 continues with step 1018.

Step 1014 is a decision. If, in step 1014, method 1000 determines that the location is within an inclusion zone or without an exclusion zone, method 1000 continues with step 1016; otherwise method continues with step 1018. There could be an inclusion and/or an exclusion zone for any user. The same location information could trigger an inclusion and/or an exclusion zone. The web server software can notify the monitor of the user of a potential violation. The bracelet system may execute geo-fencing functionality.

Step 1018 is a decision. If, in step 1018, method 1000 determines that data has already been transmitted, method 1000 continues with step 1020; otherwise method 1000 continues with step 1010. In step 1020, method 1000 resends the data to the web server. In one example of step 1020, software 844 resends message 860 to server 880. Method 1000 then continues with step 1012.

Figure 11:
FIG. 11 shows an exemplary location activity report generated by the web application of FIG. 8 running on the server.

FIG. 11 shows an exemplary location activity report 1100 generated by web application 884 running on server 880. Report 1100 includes user identification information 1102 and a list 1104 of reported activity, each activity defining date, time, location, detailed description of activity, court or info, calendar and violations.

Figure 12:
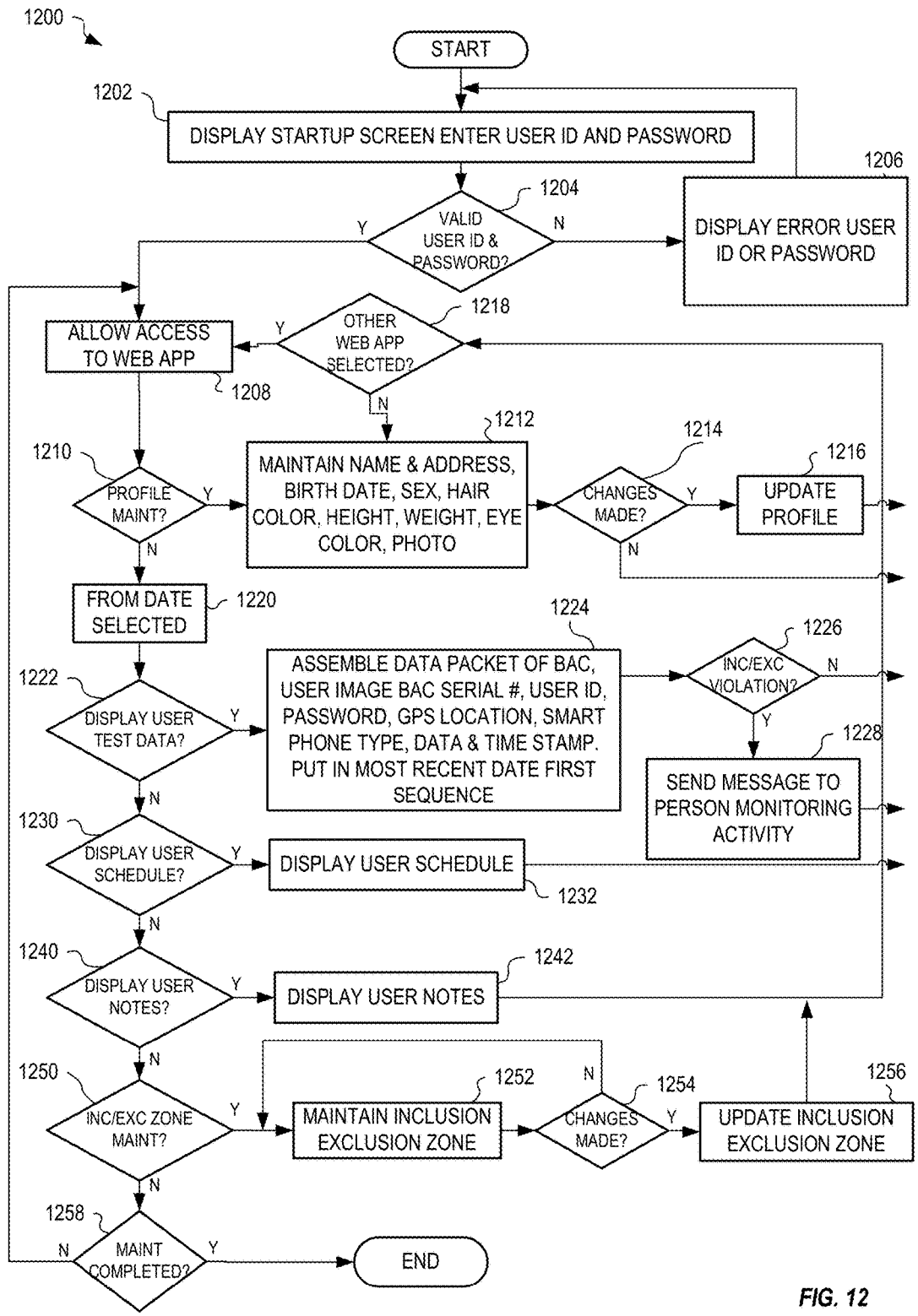
FIG. 12 is a flowchart illustrating one exemplary method for monitoring the location of an individual, in an embodiment.

FIG. 12 is a flowchart illustrating one exemplary method 1200 for monitoring the location of an individual, in an embodiment. Method 1200 is for example implemented within web application 884 running on server 880.

Steps 1202 through 1208 control access to functionality of web application 884, wherein a user (e.g., an administrator and/or official) of web application 884 is required to login with a username and a password. Other access control mechanisms (e.g., biometrics) may be used without departing from the scope hereof.

Step 1210 is a decision. If, in step 1210, method 1200 determines that the user has selected profile maintenance, method 1200 continues with steps 1212 through 1218 that allow the user to create or modify a profile stored within database 882 of server 880.

In step 1220, where profile maintenance is not selected by the user, method 1200 receives a from date. In one example of step 1220, the user selects a past date from which reports will be generated.

Steps 1222 through 1228 allow the user to display captured activity information of the subject. See for example report 1100 of FIG. 11 that shows an activity list for a subject.

Steps 1230 and 1232 allow the user to display the defined schedule for the subject. For example, the displayed schedule may include a reporting interval between location reports for the subject.

Steps 1240 and 1242 allow the user to display any recorded notes on the subject.

Steps 1250 through 1256 allow the user to maintain any defined inclusion and exclusion zones for the subject. For example, the user may define an exclusion zone that causes the communication device to generate an alert display and message when the subject enters a forbidden area. Although the process described above in some cases may involve interaction of the individual being monitored with a user interface of the communication device, it will be appreciated that monitoring events may be executed without generating user interfaces as the communication device, or with minimal user interfaces, as may be desired. For example, timed or notification based alerts can be broadcast (or otherwise delivered) and considered by the web server, communication device and the bracelet automatically. Unless a photo or user provided input is required it can all take place without the need to turn on the communication device display. This approach would also have the beneficial side-effect of consuming far less battery power.

Figure 13:
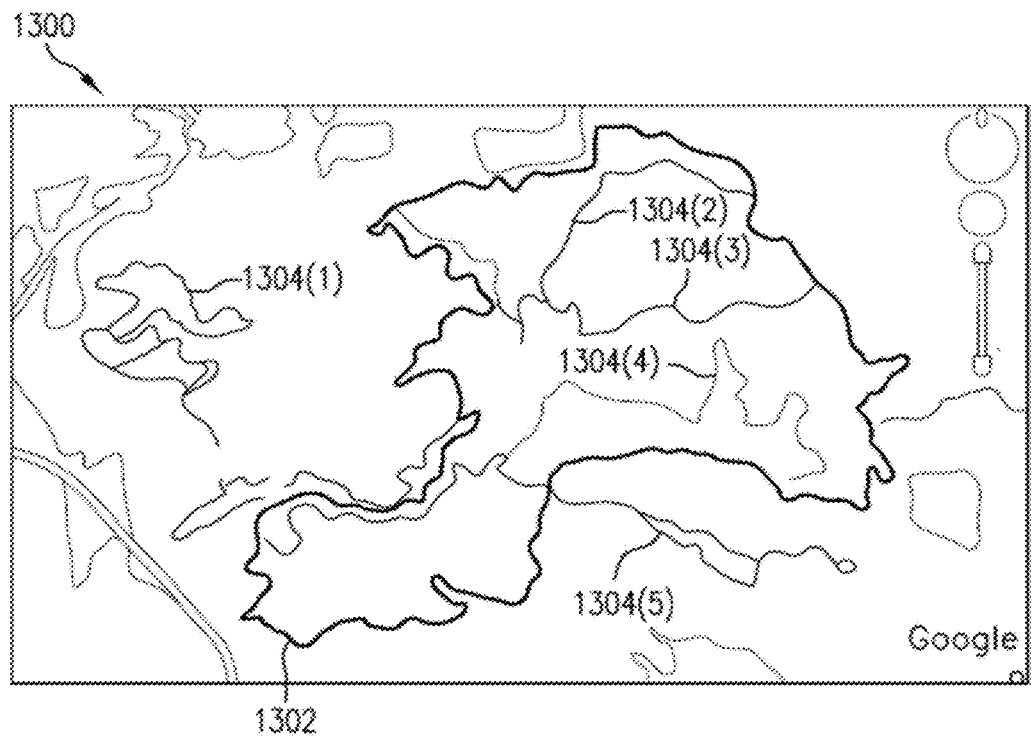
FIG. 13 shows one exemplary map generated by the system of FIG. 8 illustrating an inclusion zone indicated in blue outline, and a plurality of breadcrumb trails that represent the subject's recorded movement.

FIG. 13 shows one exemplary map 1300 within an inclusion zone 1302 indicated in blue outline, and a plurality of breadcrumb trails 1304 that represent the subject's recorded movement.

Figure 14:
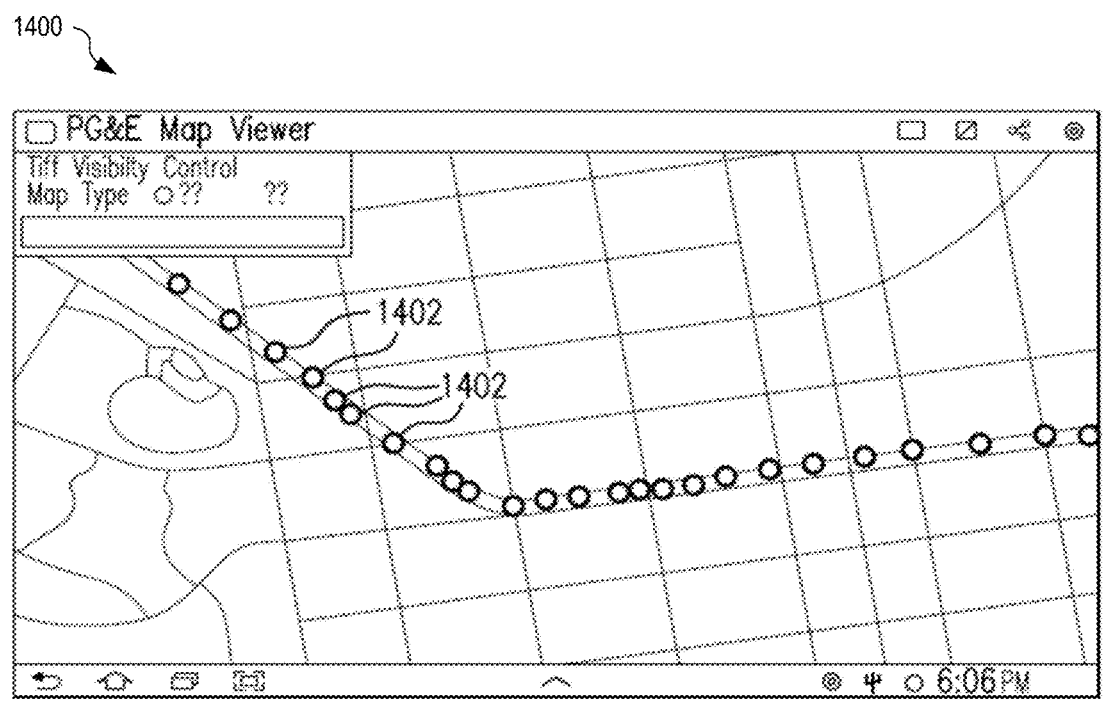
FIG. 14 shows an exemplary map generated by the system of FIG. 8 illustrating a plurality of recorded locations representing movement of the subject.

FIG. 14 shows an exemplary map 1400 indicating a plurality of recorded locations 1402 representing movement of the subject.

Figure 15:
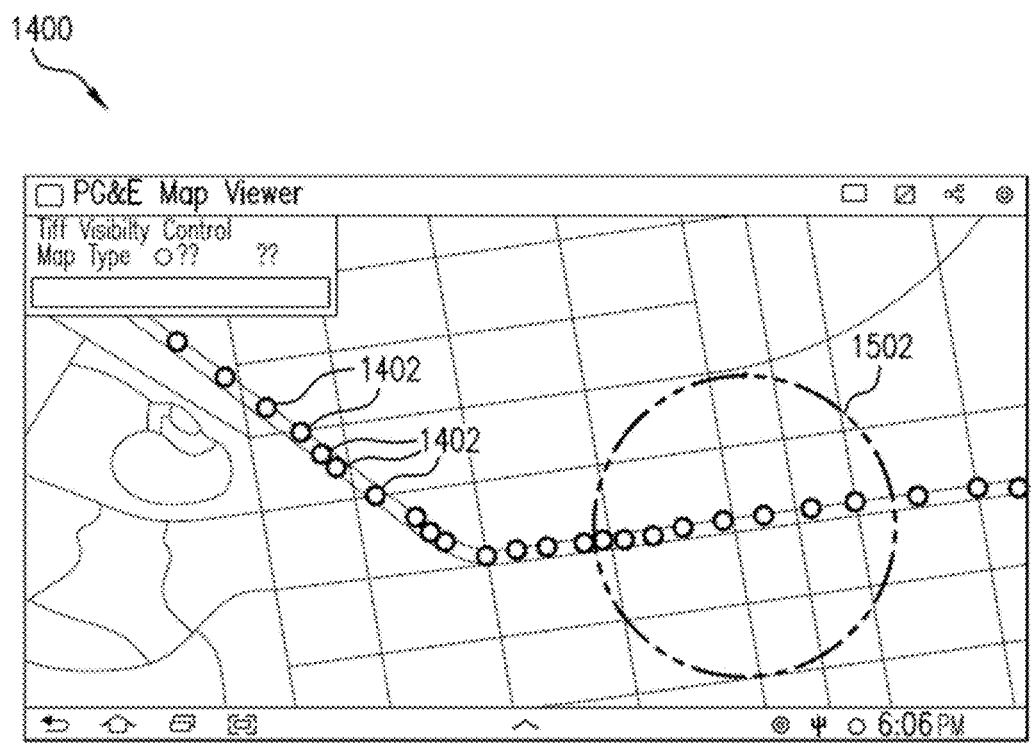
FIG. 15 shows the map of FIG. 14 with an exemplary exclusion zone.

FIG. 15 shows map 1400 of FIG. 14 with a defined exclusion zone 1502.

Web application 884 includes functionality for displaying and printing collected information based upon subject identification, date, time, location and indicated status of the subject. For example, web application 884 may allow the user to display a list of subjects that are currently in violation of defined inclusion and exclusion zones. Web application 884 may also allow the user to send one or more of text messages, audible messages, and indication tones to a tracked subject to prompt the subject to take a particular action (e.g., one or more of take a breath test, return to a defined inclusion zone, and exit from a defined exclusion zone).

Web application 884 may include a GPS tab that displays a map (e.g., a Google map) showing inclusion and exclusion zones for a subject and indicate any violations of the zones graphically. This map may also be interactive, wherein the user may position a mouse over (or click on) a breadcrumb trail or indicated location to display details such as when the location was recorded and whether any violation was reported. The GPS functionality may be used to track a subject and to determine whether the subject is within a certain radius of one or more defined locations (e.g., as defined by a court ruling). For example, within communication device 830, the GPS location may be used to determine if the subject is without an inclusion zone and/or within an exclusion zone and thereby determine that the subject is in violation. Where the subject is in violation of one or more zones, communication device 830 immediately transmits information of the violation to web application 884. The radius of these zones may be individually set for each subject. By communicating frequently with, and identifying within each communication, ankle bracelet 802, communication device 830 verifies that ankle bracelet 802 and communication device 830 are in close proximity (e.g., within communication range of interfaces 812 and 836). Since ankle bracelet 802 cannot be removed from the subject without detection of the removal by communication device 830, the communication device is able to verify that the subject is also in proximity and thereby determine the location of the subject. Communication device 830 may be configured remotely by web application 884. For example, communication device 830 may receive definitions of one or more inclusion zones and exclusion zones from web application 884. In another example, web application 884 may send a reporting interval to communication device 830, wherein the reposting interval may be dynamically adjusted based upon the determined location of the individual. In one embodiment, communication device 830 automatically adjusts the reporting interval based upon the location of the subject relative to one or more defined inclusion and/or exclusion zones. Communication device 830 may also determine and transmit a location of the subject when requested by web application 884.

In the disclosed embodiments, the use of the breathalyzer and the ankle bracelet for reporting information based upon a court ordered procedure is by example only. Systems 100 and 800 may be used to monitor and report other information for other reasons without departing from the scope hereof. For example, parents may use system 800 to track the location of their child and may use system 100 to monitor the level of drug use by their child.

Vehicle Control Device

Figure 16:
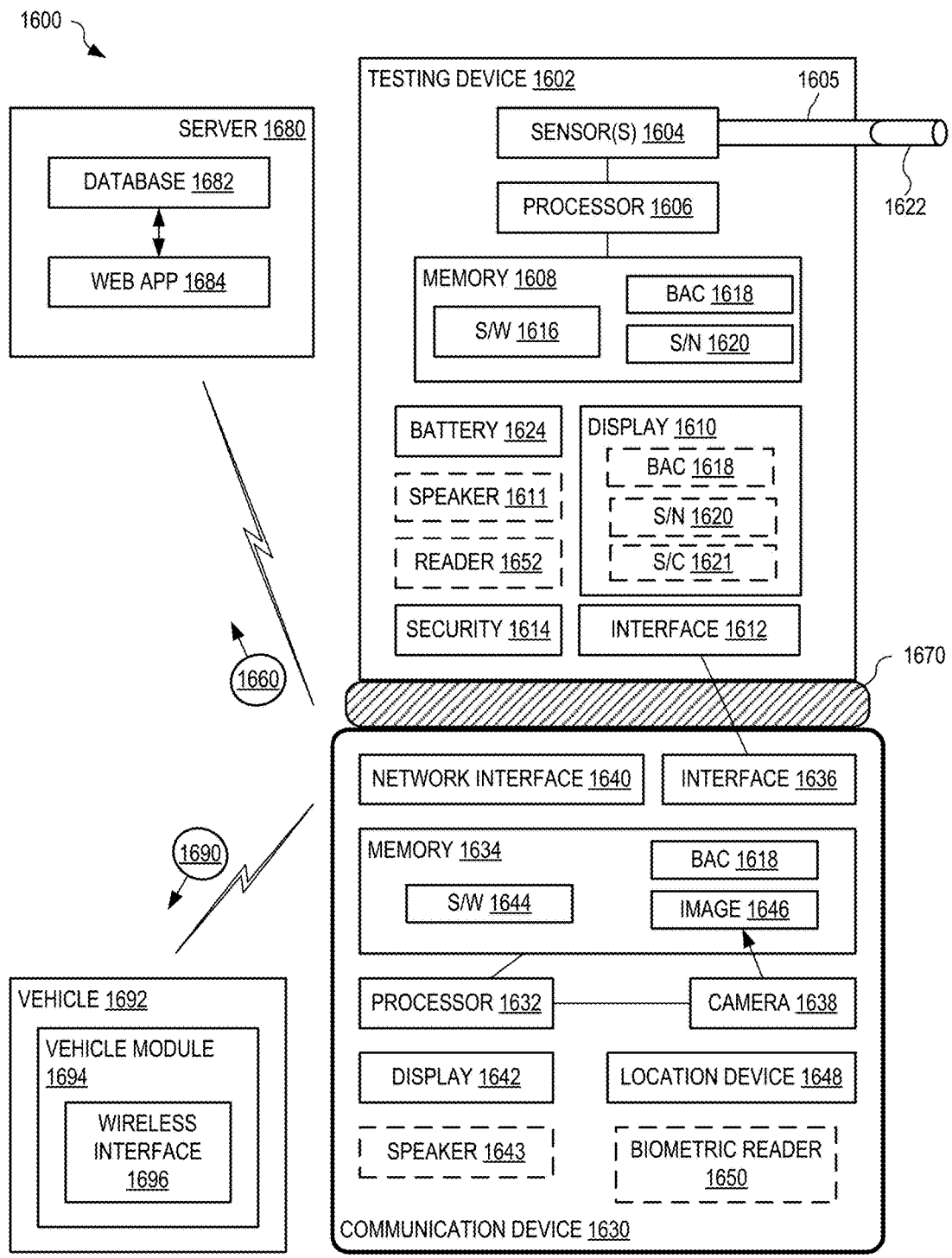
FIG. 16 shows one exemplary system for controlling operation of a vehicle based upon a measured condition of a test subject (e.g., a driver or operator of the vehicle), in an embodiment.

FIG. 16 shows one exemplary system 1600 for controlling operation of a vehicle based upon a measured condition of a test subject (e.g., a driver or operator of the vehicle).

System 1600 includes a testing device 1602 that automatically senses a condition of the test subject. Testing device 1602 includes one or more sensors 1604, a processor 1606, a memory 1608, a display 1610, a secure interface 1612, and a battery 1624. Optionally, testing device 1602 includes a security unit 1614 for monitoring integrity of testing device 1602 and indicating whether testing device 1602 has been compromised (e.g., opened and/or tampered with). Battery 1624 is selected to be of a common type with a long life and that is easily replaceable. Calibration of testing device 1602 is quick and simple.

In one embodiment, sensor 1604 detects Breath Alcohol Concentration (BAC) and is for example implemented using fuel cell technology. Testing device 1602 thus operates as a breathalyzer and includes a tube 1605 that is coupled with sensor 1604 and a distal portion 1622 coupled with tube 1605 and into which the test subject blows. Base portion of tube 1605 is permanently coupled with testing device 1602 to prevent tampering and a distal portion 1622 is replaceable.

Testing device 1602 includes software 1616, stored within memory 1608, having machine readable instructions that when executed by processor 1606 control sensor 1604 to measure BAC value 1618. BAC value 1618 is stored in memory 1608 and displayed on display 1610, as illustratively shown in dashed outline. Software 1616 may also include instructions for operating testing device 1602 that are displayed on display 1610. Security unit 1614 may include a serial number 1620 (shown stored within memory 1608) and an integrity indication (e.g., from security unit 1614) that are also displayed on display 1610 to indicate authenticity of the measured BAC value 1618.

System 1600 also includes a communication device 1630 that is shown with a processor 1632, a memory 1634, an interface 1636, a camera 1638, a network interface 1640, and a display 1642 (e.g., a user interface). Network interface 1640 represents a wireless transceiver for communicating with a cellular communication network for example. Interface 1612 of testing device 1602 and interface 1636 of communication device 1630 communicate with one another and may represent either a wired electrical interface (e.g., using a physical plug and socket) or a wireless interface (e.g., wireless transceivers that implement Bluetooth). Testing device 1602 may include a flow meter or other device known in the art of breathalyzers for determining that a full breath has been applied through tube 1605.

Testing device 1602 also includes a physical coupling mechanism 1670 (that may include interface 1612 when interface 1612 is implemented as a physical connector) for physically coupling with communication device 1630. Communication device 1630 is for example one of an iPhone and an Android smart phone that is capable of determining its location (e.g., using a GPS receiver or other location determining device) and wherein camera 1638 is front facing. When physically coupled together, testing device 1602 and communication device 1630 are oriented such that camera 1638 may capture an image 1646 of the test subject providing a sample into tube 1605 of testing device 1602. In one embodiment, the image is a plurality of images captured periodically during the provision of the sample. In particular, testing device 1602 is configured such that, when physically coupled with communication device 1630, tube 1605, distal portion 1622 and display 1610 are visible within image 1646 captured by camera 1638. Further, testing device 1602 is also configured such that camera 1638 also captures image 1646 to include a front view of the face of the test subject providing a breath sample into tube 1605.

Upon completion of a measurement, BAC value 1618 is communicated from testing device 1602 to communication device 1630 via interface 1612 and interface 1636. Testing device 1602 is controlled from communication device 1630 via interface 1612 and interface 1636. Software 1644, stored within memory 1634 of communication device 1630, includes machine readable instructions that when executed by processor 1632 interact with testing device 1602 to control sensing of BAC value 1618 within a breath sample and transfer of BAC value 1618 to memory 1634. Optionally, BAC value 1618, serial number 1620, and image 1646 are sent, via communication device 1630 under control of software 1644, as a message 1660 to a database 1682 and/or a web application 1684 running on a server 1680. That is, in one embodiment, system 1600 operates similar to system 100 of FIG. 1 to allow web application 1684 to track measurements of testing device 1602. One or more of web application 1684, software 1644 and software 1616 includes facial recognition functionality for automatically recognizing the face of the test subject within image 146, wherein an alert may be automatically generated if the face of the test subject is not recognized.

A vehicle 1692 is fitted with a vehicle module 1694 that is hard wired to the ignition system of the vehicle for example. Vehicle 1692 represents any type of motorized vehicle with a motor, including a car, a motorcycle, an electric vehicle, a hybrid vehicle, and so on. Vehicle module 1694 prevents operation of the vehicle unless specifically enabled via a wired or wireless interface 1696 within vehicle module 1694 and may also activate the headlamps and/or the horn of vehicle 1692 when a test is required during vehicle operation and indicates a BAC value above a predetermined threshold. That is, system 1600 may operate to perform BAC tests, using testing device 1602, while the test subject operates vehicle 1692, wherein for safety reasons the headlamps and/or the horn of vehicle 1692 are activated instead of the vehicle being disabled.

In one embodiment, vehicle module 1694 communicates wirelessly, via wireless interface 1696, with network interface 1640 of communication device 1630, wherein communication device 1630 sends an enable signal 1690 to vehicle module 1694 when BAC value 1618 has a value below a predefined threshold to allow unfettered operation of the vehicle. Communication between vehicle module 1694 and communication device 1630 is secure and tamper proof, thereby ensuring that enable signal 1690 cannot be provided by another device. Communication between vehicle module 1694 and communication device 1630 may also be implemented through wires and physical couplings (e.g., a dock for receiving communication device 1630) without departing from the scope hereof. For example, where wireless communication is not considered secure, a wired interface between communication device 1630 and vehicle module 1694 may be provided. Where vehicle module 1694 interfaces directly with a computer system of vehicle 1692, vehicle module 1694 and/or communication device 1630 may utilize added security encryption, for example as required by a vehicle manufacturer.

In one example of operation, communication device 1630 waits to receive a confirmation signal from web application 1684 before sending enable signal 1690 to vehicle module 1694. In one embodiment, the confirmation signal is granted by a third party via web application 1684, such as when a parent grants authority for a son or daughter to use vehicle 1692, or such as when, during an emergency situation, even when BAC value 1618 is above the predefined threshold, operation of vehicle 1692 is allowed.

In an alternate embodiment, vehicle module 1694 communicates directly with testing device 1602 via interfaces 1696 and interface 1612 (or via a hard wired interface), wherein vehicle module 1694 includes intelligence (e.g., a processor, memory, and software) that determine whether the vehicle should be operable (i.e., enabled) based upon the BAC value 1618 received from testing device 1602 within enable signal 1690. In one example of operation, testing device 1602 and vehicle module 1694 form a secure communication link, wherein operation of testing device 1602 is controlled by vehicle module 1694 to periodically request BAC testing of samples from the test subject during operation of vehicle 1692. That is, testing device 1602 and vehicle module 1694 may operate independently of communication device 1630 in certain circumstances.

In one embodiment, for each operation of testing device 1602, a security code (S/C) 1621 that is a randomly generated number from server 180 is received and stored within memory 1608. S/C 1621 is displayed on display 1610 such that it is captured within image 1646 by camera 1638 of communication device 1630, and optionally added to message 1660. Use of S/C/1621 prevents fraudulent use of testing device 1602 since S/C 1621 cannot be predicted and is generated for each use of testing device 1602.

In another embodiment, security unit 1614 (or software 1616) includes a pseudo random number generator that generates S/C 1621 that appears to be random to the test subject. In this embodiment, security unit 1614 generates a next number in the sequence for each use of testing device 1602, where the same sequence of numbers generated by security unit 1614 is also generated within server 1680 and thereby allows server 1680 to validate each use of testing device 1602 to detect misuse thereof. For example, upon receiving message 1646, web application 1684 automatically detects and recognizes S/C 1621 within image 1646 and compares the recognized value against the generated (or predicted) S/C 1621 and generates a notification when there is a mismatch. Thus, potential misuse (e.g., where the test subject attempts to reuse a previously determined BAC value and image or attempts to use a testing device assigned to another test subject) of testing device 1602 is quickly identified.

Optionally, one or both of testing device 1602 and communication device 1630 includes a speaker 1611, 1643 that under control of software 1616, 1644, respectively, may generate audio to alert the test subject. For example, web application 1684 may send a message to communication device 1630 that causes speaker 1643 to generate a sound, for example to remind the test subject that a next test is overdue. In another example of operation, upon receiving a message from web application 1684, communication device 1630 sends a message to testing device 1602 causing speaker 1611 to generate a sound. Thus, system 1600 allows web application 1684 and/or communication device 1630 to audibly notify the test subject of an overdue test for example.

Although shown as different devices, communication devices 130, 830, and 1630 may be the same device, wherein functionality of software 144, 844, and 1644 is combined to allow the communication device to operate with any one or more of devices 102, 802, and 1602. In one example, a communication device (e.g., one of communication devices 130, 830, and 1630) couples with a BAC testing device (e.g., one of testing devices 102 and 1602), a bracelet (e.g., bracelet 802) and a vehicle module (e.g., vehicle module 1694), wherein the communication device may also communicate with a web app (e.g., one or all of web applications 184, 884, and 1684) running on one or more servers (e.g., one or more of servers 180, 880, and 1680). In one example of operation, the communication device communicated with the testing device to measure BAC of the test subject, and may also communicate with the bracelet to ensure the proximity of the test subject to the communication device. That is, the communication device, testing device, and bracelet may operate concurrently to measure drug use of the test subject and monitor movement of the test subject. Where the test subject also wishes to operate a vehicle (e.g., vehicle 1692), the communication device and the vehicle module may communicate to enable the vehicle when BAC of the test subject if measured and below a predefined threshold.

Systems 100 and 1600 may also be adapted for monitoring body vitals including one or more of: Blood Sugar level, Heart conditions, Blood attributes, Brain Waves, animal drug levels, perspiration, respiration, and electromagnetic energy, and other body vitals without departing from the scope hereof. For example, communication devices 130, 1630 may communicate with other types of testing device (e.g., a heart rate monitor) such that the communication device may automatically generate an alert when a predefined heart rate threshold (low and/or high) is exceeded. In one embodiment, bracelet 802 includes additional sensors for monitoring certain vitals of the wearer and for sending the measured vitals periodically to communication device 830.

In one embodiment, communication device 1630 includes a biometric reader 1650 that is utilized by software 1644 to obtain a biometric image (e.g., a finger print, a retinal scan, and so on) of the test subject, wherein the biometric image may be used to provide additional verification of the identity of the test subject. In another embodiment, testing device 1602 includes a biometric reader 1652 that is utilized by software 1616 to capture a biometric image of the test subject, wherein the biometric image is used to provide additional verification of the identity of the test subject.

Where system 1600 includes one or both of biometric readers 1650 and 1652, the captured biometric image may also be included within message 1660, wherein web application 1684 of server 1680 may implement additional validation of the test subject based upon the biometric image and a master biometric image stored within database 1682 in association with the test subject, for example. Where the biometric image does not match the master biometric image, web application 1684 may generate an alert to an administrator and/or operator of system 1600. Thus, the alert indicating the possibility of fraudulent use of testing device 1602.

Figure 17:
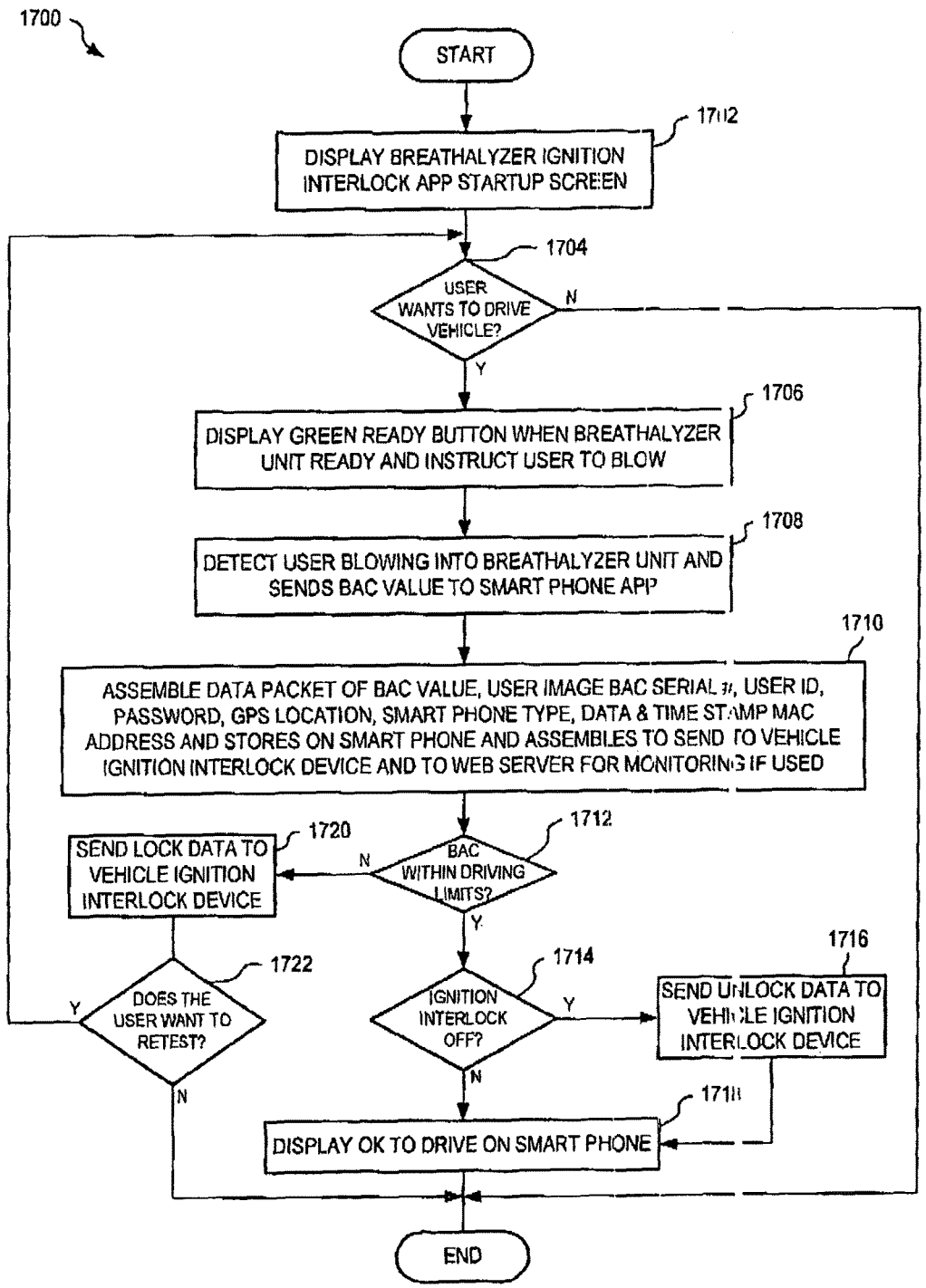
FIG. 17 is a flowchart illustrating one exemplary method for controlling operation of a vehicle based upon a measured condition of an operator of the vehicle, in an embodiment.

FIG. 17 is a flowchart illustrating one exemplary method 1700 for controlling operation of vehicle 1692 based upon a measured condition of a test subject (e.g., a driver or operator of the vehicle). Method 1700 is for example implemented in part within each of: software 1644 of communication device 1630, software 1616 of testing device 1602, and web application 1684 of server 1680.

In step 1702, method 1700 displays a Breathalyzer ignition interlock app startup screen. In one example of step 1702, software 1644 displays a startup screen on display 1842 of communication device 1630 to indicate operation of system 1600. Step 1704 is a decision. If, in step 1704, method 1700 determines that the individual wants to drive vehicle 1692, method 1700 continues with step 1706; otherwise, method 1700 terminates.

In step 1706, method 1700 displays a green ready button when communication is established between testing device 1602 and communication device 1630. In one example of step 1706, software 1644 displays a green button on display 1642. In step 1708, method 1700 detects the individual blowing into testing device 1602 and measures and sends the BAC to the communication device. In one example of step 1708, testing device 1602 detects the breath as the individual blows into tube 1605, measures BAC value 1618 using sensor 1604, and then sends BAC value 1618 to communication device 1630 via interfaces 1612 and 1636.

In step 1710, method 1700 receives, within the communication device, the BAC level from the testing device, assembles a data-packet containing the BAC, an image of the individual blowing into testing device 1602, and one or more of a BAC serial number, a user ID, a password, a location, a communication device type, a date and timestamp, and a MAC address, and sends the data-packet to a web application running on a server and to a vehicle ignition interlock device. In one example of step 1710, communication device 1630 receives BAC value 1618 from testing device 1602 via interfaces 1612 and 1636, assembles message 1660 containing BAC value 1618, image 1646, captured by communication device 1630 of the individual providing a sample into testing device 1602, serial number 1620, and a date and timestamp. Communication device 1630 then sends message 1660 to web application 1684 and optionally, where vehicle module 1694 contains intelligence, sends enable signal 1690 to vehicle module 1694.

Step 1712 is a decision. If, in step 1712, method 1700 determines that the BAC is within the limits for driving the vehicle, method 1700 continues with step 1714; otherwise, method 1700 continues with step 1720. In one example of step 1712, software 1644 compares BAC value 1618 with a predefined threshold to determine whether the individual has a low enough BAC to operate vehicle 1692.

Step 1714 is a decision. If, in step 1714, method 1700 determines that the ignition interlock has been turned off, method 1700 continues with step 1716; otherwise, method 1700 continues with step 1718. In one example of step 1714, communication device 1630 stores within memory 1634 a status of vehicle module 1694 that indicates whether the ignition interlock is enabled or disabled. In another example of step 1714, software 1644 interrogates vehicle module 1694 to determine the status of the ignition interlock.

In step 1716, method 1700 sends unlock data to the vehicle ignition interlock device. In one example of step 1716, software 1644 sends an unlock code within enable signal 1690 to vehicle module 1694 via interface 1636 to enable unfettered operation of vehicle 1692.

In step 1718, method 1700 displays an "OK to Drive" message on the communication device. In one example of step 1718, software 1644 displays the text "OK to Drive" on display 1642. Method 1700 then terminates.

In step 1720, method 1700 sends lock data to the vehicle ignition interlock device. In one example of step 1720, software 1644 sends enable signal 1690 containing a lock code to vehicle module 1694 to disable operation of the engine of vehicle 1692. Method 1700 then continues with step 1722.

Step 1722 is a decision. If, in step 1722, method 1700 determines that the user wishes to retest, method 1700 continues with step 1704; otherwise, method 1700 terminates. In one example of step 1722, software 1644 interacts with the individual by displaying, using display 1642, a message asking whether to retest, and receives a yes or no input from the individual.

Optionally, one or both of testing device 1602 and communication device 1630 includes a speaker 1611, 1643 that under control of software 1616, 1644, respectively, may generate audio to alert the test subject. For example, web application 184 may send a message to communication device 130 that causes speaker 143 to generate a sound, for example to remind the test subject that a next test is overdue. In another example of operation, upon receiving a message from web application 184, communication device 130 sends a message to testing device 102 causing speaker 111 to generate a sound. Thus, system 100 allows a monitoring authority, via one or both of web application 184 and/or communication device 130, to audibly notify the test subject of an overdue test or to request a random sampling for example.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for locating and determining substance use, comprising:
   physically coupling a communication device, including a camera, to a separate testing device including a display, such that the camera maintains view of the display;
   with the camera, capturing an image simultaneously containing:
      at least a portion of a face of the test subject while (a) the test subject provides a test sample to the testing device, and,
      (b) the display is oriented away from the test subject;
   at the testing device, sensing a level of the substance within the test sample;
   at the communication device, determining a location of the test subject;
   communicating the level of the substance and a unique serial number of the testing device to the communication device;
   and
   sending the image, the level of the substance, the location of the test subject, and the unique serial number of the testing device from the communication device to a remote server.

2. The method of claim 1, further comprising operating the communication device to obtain biometric information for verifying an identity of the test subject.

3. The method of claim 1, the image further simultaneously capturing the display visually displaying the unique serial number.

4. The method of claim 3, further comprising receiving a security code at the testing device and displaying the security code on the display of the testing device for capture within the image, the security code being a random value generated by the remote server and received via the communication device.

5. The method of claim 1, further comprising:
   automatically recognizing, at the remote server, the face of the test subject within the image; and
   generating, at the remote server, an alert when the face of the test subject within the image is not recognized.

6. The method of claim 1, wherein the test subject is prompted by the communication device, based upon a defined schedule, to provide the test sample.

7. The method of claim 1, wherein the test sample is a breath and the substance is alcohol.

8. The method of claim 1, wherein the test sample is a breath and the substance is Marijuana.

9. The method of claim 1, further comprising sending the level of the substance to a vehicle module coupled to a vehicle, wherein operation of the vehicle is based upon a comparison of the level of the substance to a predefined threshold.

10. The method of claim 1, the captured image further simultaneously including a tube permanently attached to the testing device and used by the test subject to provide the test sample.

11. The method of claim 2, further comprising verifying, within the remote server, the identity of the test subject using the biometric information.

12. The method of claim 1, further comprising operating the testing device to obtain biometric information for verifying an identity of the test subject.

13. The method of claim 12, further comprising verifying, within the remote server, the identity of the test subject using the biometric information.

14. The method of claim 1, further comprising:
   automatically recognizing, within the communication device, the face of the test subject within the image; and
   generating, within the communication device, an alert when the face of the test subject within the image is not recognized.

15. The method of claim 1, the physically coupling a communication device including physically coupling the communication device to a cradle of the testing device.

16. The method of claim 1, further comprising displaying the security code on the display of the testing device, as a pseudo random value generated by the testing device, for capture within the image.

17. The method of claim 16, the remote server automatically detecting and recognizing the security code within the image to validate the testing device.

18. A testing device for determining a substance level within a test subject, comprising:
   a sensor, within a foldable housing of the testing device, configured to sense the substance level within a test sample provided by the test subject;
   a display, on the foldable housing, configured to display a visual representation of at least one of a testing device identification, a test identification, and biometric information, the display oriented away from a test subject when using the sensor;
   an interface, within the foldable housing, configured to communicate the substance level to a communication device separate from the testing device;

the foldable housing moveable between extended and collapsed configurations; and, the foldable housing including
a physical coupling mechanism configured to physically position, when the foldable housing is in the extended configuration, the communication device such that a camera thereof is configured to capture an image simultaneously containing:
at least part of a face of the test subject providing the test sample, and the display.

19. The testing device of claim 18, wherein the communication device communicates the substance level to a remote server.

20. The testing device of claim 18, the communication device configured to communicate the substance level to a vehicle module that enables and disables operation of a vehicle based upon the substance level.

21. The testing device of claim 18, further comprising:
a memory for storing a unique serial number of the testing device;
a processor; and
software stored within the memory and comprising machine readable instructions that when executed by the processor perform the steps of:
determining the substance level based upon information read from the sensor when the test sample is provided by the test subject;
displaying a visual representation of the unique serial number of the testing device on the display; and
sending, via the interface, a digital value representing the substance level and a digital value representing the unique serial number of the testing device to the communication device.

22. The testing device of claim 18, wherein the communication device captures an image of the display and the face of the test subject in response to a signal from a remote server.

23. The testing device of claim 18, further comprising a biometric reader for providing additional identification information of the test subject.

24. The testing device of claim 18, further comprising a speaker for generating a sound to indicate that a sample is to be provided.

25. The testing device of claim 21, the software further comprising machine readable instructions that when executed by the processor perform the steps of:
generating a pseudo random security code; and
displaying the pseudo random security code on the display for capture within the image;
the pseudo random security code being detected and recognized within the image by a remote server to validate the testing unit.

26. A method for monitoring substance use, comprising:
at a communication device separate from a testing device, obtaining a level of the substance within a test sample provided by a subject to the testing device;
operating the communication device, while the communication device is physically coupled to the testing device, to obtain test verification information correlated to the test sample, the test verification information including an image simultaneously containing at least a portion of the face of the subject and a display of the testing device oriented towards the communication device; and
sending the level of the substance and the test verification information from the communication device to a remote server.

27. The method of claim 26, wherein said step of obtaining comprises receiving one or more messages from a testing device.

28. The method of claim 27, wherein said messages include at least one of an identification of the testing device and an identification of a test by which the test sample was provided.

29. The method of claim 27, wherein said test verification information comprises biometric information obtained using said communication device.

30. The method of claim 29, wherein said biometric information comprises at least one of an image of a face of the subject, an image of an iris of the subject and a fingerprint of the subject.

31. The method of claim 26, wherein said sending comprises transmitting image information and digital information that includes at least one identical element when the test sample is authentic.

32. The method of claim 26, the operating the communication device occurring while the communication device is physically coupled to a cradle of the testing device.

33. A testing device for determining a substance level in a test subject, comprising:
a sensor, located at a housing of the testing device, configured to sense the substance level within a test sample provided by the test subject;
an interface, within the housing, configured to communicate the substance level to one of a communication device separate from the testing device; and
the housing including a physical coupling mechanism for positioning said communication device with respect to said testing device;
said testing device having a housing that is movable between extended and collapsed configurations such that, in said extended configuration, said physical mechanism positions a camera of said communication device for acquiring an image simultaneously containing a face of said test subject and a display of the testing device each oriented towards the camera.

34. A software product comprising stored instructions, stored on non-transitory computer-readable media, wherein the stored instructions, when executed by a digital processor of a communication device removably attached to a testing device, perform steps for controlling the testing device to determine a substance level in a test sample provided to the testing device by a test subject, the stored instructions comprising instructions for:
from the communication device, generating a prompt for the test subject to provide the test sample to the testing device;
using a camera of the communication device, periodically capturing a plurality of images of the test subject providing the test sample to the testing device, the plurality of images simultaneously including at least a portion of the test subject and a display of the testing device oriented towards the camera;
from the communication device, controlling the testing device to detect the substance level within the test sample;
within the communication device and from the test device, receiving, a value indicative of the substance level;
within the communication device, determining a current location; and
from the communication device, sending the plurality of images, the value indicative of the substance level, and/or the current location to a remote server.

35. The software product of claim 34, further comprising instructions for validating connectivity and operation of the particular testing device prior to receiving the test sample.

36. The software product of claim 34, further comprising instructions for displaying, on the communication device, a status of connectivity between the communication device and the testing device.

37. The software product of claim 34, further comprising instructions for verifying the identity of the test subject within at least one of the plurality of images using biometric information.

38. The software product of claim 35, further comprising instructions for generating an alert when the identity of the test subject is not verified.

39. The software product of claim 34, the instructions for receiving further comprising instructions for receiving, within the communication device and from the testing device, a unique serial number of the testing device, the instructions for sending further comprising instructions for sending the unique serial number to the remote server with the value indicative of the substance level.

40. The software product of claim 34, further comprising instructions for capturing, within the communication device, biometric information of the test subject, the instructions for sending further comprising instructions for sending the biometric information to the remote server with the value indicative of the substance level.

41. The software product of claim 34, the communication device comprising a smart device.

* * * * *